United States Patent
Funck

(10) Patent No.: US 9,596,802 B2
(45) Date of Patent: Mar. 21, 2017

(54) DISTRIBUTION UNIT FOR GRANULAR COMMODITY, IN PARTICULAR A SOWING UNIT

(71) Applicant: Horsch Maschinen GmbH, Schwandorf (DE)

(72) Inventor: Gerald Funck, Schatthausen (DE)

(73) Assignee: HORSCH MASCHINEN GMBH, Schwandorf (DE)

( * ) Notice: Subject to any disclaimer, the term of this patent is extended or adjusted under 35 U.S.C. 154(b) by 81 days.

(21) Appl. No.: 14/407,547

(22) PCT Filed: Jun. 10, 2013

(86) PCT No.: PCT/EP2013/061926
§ 371 (c)(1),
(2) Date: Dec. 12, 2014

(87) PCT Pub. No.: WO2013/186175
PCT Pub. Date: Dec. 19, 2013

(65) Prior Publication Data
US 2015/0163991 A1    Jun. 18, 2015

(30) Foreign Application Priority Data
Jun. 12, 2012    (DE) .................. 10 2012 105 048

(51) Int. Cl.
*A01C 7/04*    (2006.01)
*A01C 7/20*    (2006.01)
(Continued)

(52) U.S. Cl.
CPC .................. *A01C 7/12* (2013.01); *A01C 7/04* (2013.01); *A01C 7/081* (2013.01); *A01C 15/00* (2013.01); *A01C 7/20* (2013.01)

(58) Field of Classification Search
CPC ......... A01C 17/00; A01C 7/04; A01C 17/003; A01C 17/008; G01F 13/005
(Continued)

(56) References Cited

U.S. PATENT DOCUMENTS 2,068,382 A * 1/1937 Kriegbaum .............. A01C 7/04
                                                                222/222
2,975,936 A * 3/1961 Rousek .................... A01C 7/04
                                                                111/183
(Continued)

FOREIGN PATENT DOCUMENTS

CN    100998281 A    7/2007
DE       1027924 B    4/1958
(Continued)

OTHER PUBLICATIONS

Written Opinion of the International Searching Authority, International application No. PCT/EP2013/061926 dated Dec. 12, 2014.

*Primary Examiner* — John G Weiss
(74) *Attorney, Agent, or Firm* — Erickson Kernell IP, LLC

(57) ABSTRACT

The invention relates to a distribution unit (10) for a granular commodity such as grains (34), fertilizer or the like, in particular a sowing unit (12) of a distribution or sowing machine. The unit (10, 12) comprises a housing (14) having an approximately circular and/or circle-segment shaped inner lateral surface (16), at least one inlet opening (18) for conveyed granular commodities or conveyed grains (34), a conveying device (22) rotating concentrically in the housing (14) for the conveyed granular commodity or the conveyed grains (34) and at least one outlet opening (24) which connects approximately tangentially to the inner lateral surface (16). The conveying device (22) has one or more openings and/or steps on the outer region thereof, which, in a first housing and/or conveying region, form a pocket with
(Continued)

the housing inner lateral surface (16) in which the grains (34) are compacted and conveyed circularly by centrifugal forces, supported by the conveying device (22). In a second housing and/or separation region, only one single grain (34) remains in the opening or in the step of the conveying device (22) due to a modified contour of the inner lateral surface (16) of the housing (14) and under centrifugal force influences, while excess grains (34) are separated and conveyed back to the first housing region for re-conveying.

17 Claims, 35 Drawing Sheets

(51) Int. Cl.
  *A01C 7/12* (2006.01)
  *A01C 7/08* (2006.01)
  *A01C 15/00* (2006.01)

(58) Field of Classification Search
  USPC ........ 111/170, 171, 174, 177, 183–185, 178; 221/278, 217; 222/240–241; 198/671, 198/550.01
  See application file for complete search history.

(56) References Cited

U.S. PATENT DOCUMENTS

| | | | | |
|---|---|---|---|---|
| 3,347,426 A | * | 10/1967 | Morrison, Jr. | A01C 7/04 111/144 |
| 3,348,504 A | * | 10/1967 | Fischer | A01C 7/04 111/184 |
| 3,638,829 A | * | 2/1972 | Frase | A01C 7/04 221/219 |
| 3,796,346 A | * | 3/1974 | Ribouleau | A01C 7/046 111/185 |
| 4,450,979 A | * | 5/1984 | Deckler | A01C 7/04 221/263 |
| 5,027,725 A | * | 7/1991 | Keeton | A01C 7/04 111/184 |
| 5,082,141 A | | 1/1992 | Martin et al. | |
| 6,173,664 B1 | * | 1/2001 | Heimbuch | A01C 7/04 111/171 |
| 6,247,417 B1 | * | 6/2001 | Heimbuch | A01C 7/04 111/178 |
| 6,481,647 B1 | * | 11/2002 | Keaton | A01C 7/20 239/654 |
| 8,371,240 B2 | * | 2/2013 | Wollenhaupt | A01C 7/06 111/185 |
| 8,720,352 B2 | * | 5/2014 | Logan | A01C 5/064 111/167 |
| 2015/0163990 A1 | * | 6/2015 | Audigie | A01C 7/046 111/185 |

FOREIGN PATENT DOCUMENTS

| | | | |
|---|---|---|---|
| DE | 2217513 A1 | 11/1972 | |
| DE | 3615189 C1 * | 4/1987 | ............. A01C 7/04 |
| DE | 3633955 A1 | 5/1987 | |
| DE | 3822437 A1 | 1/1989 | |
| DE | 3826321 A1 | 2/1990 | |
| DE | 4116724 A1 | 11/1992 | |
| DE | 19636787 C1 | 4/1998 | |
| EP | 0636306 A1 | 9/1997 | |

* cited by examiner

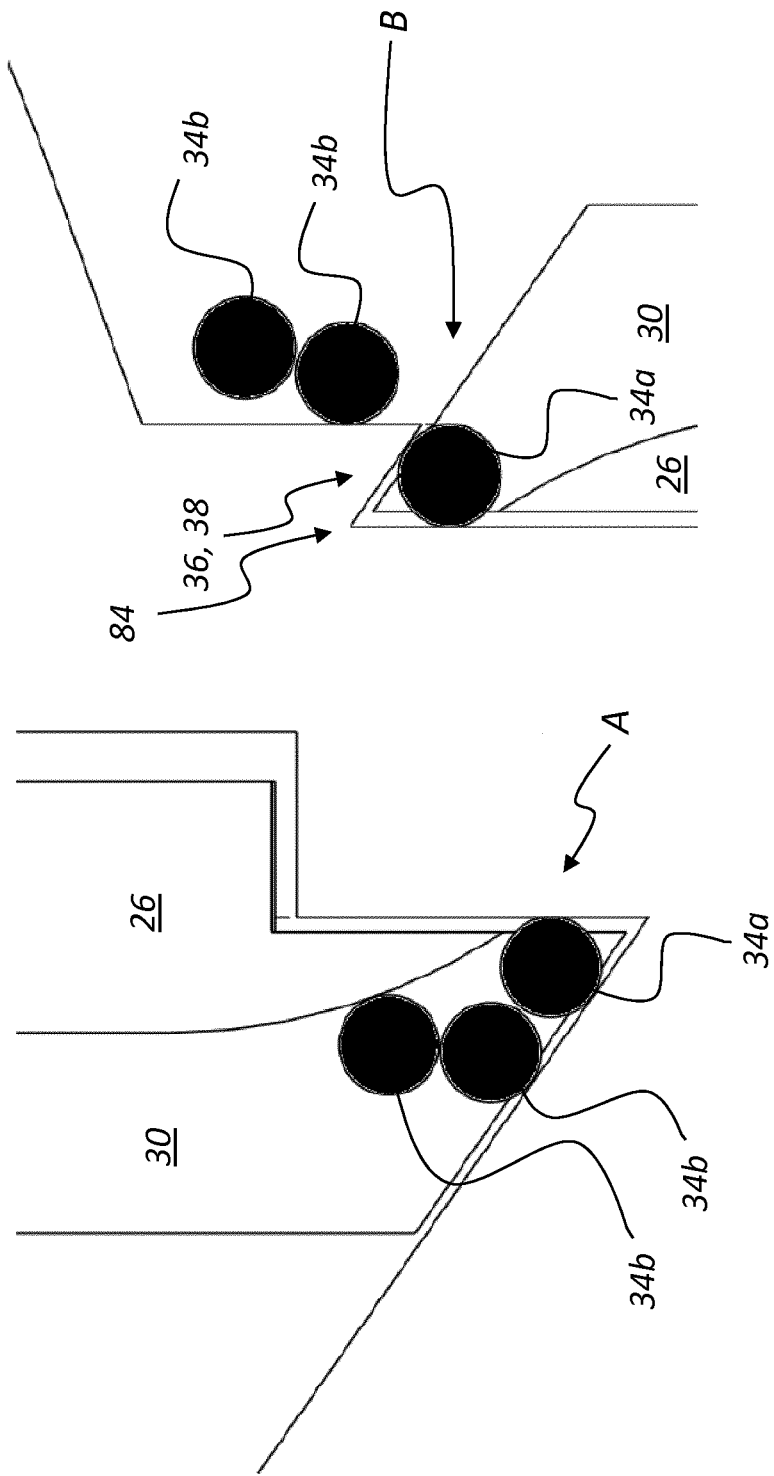

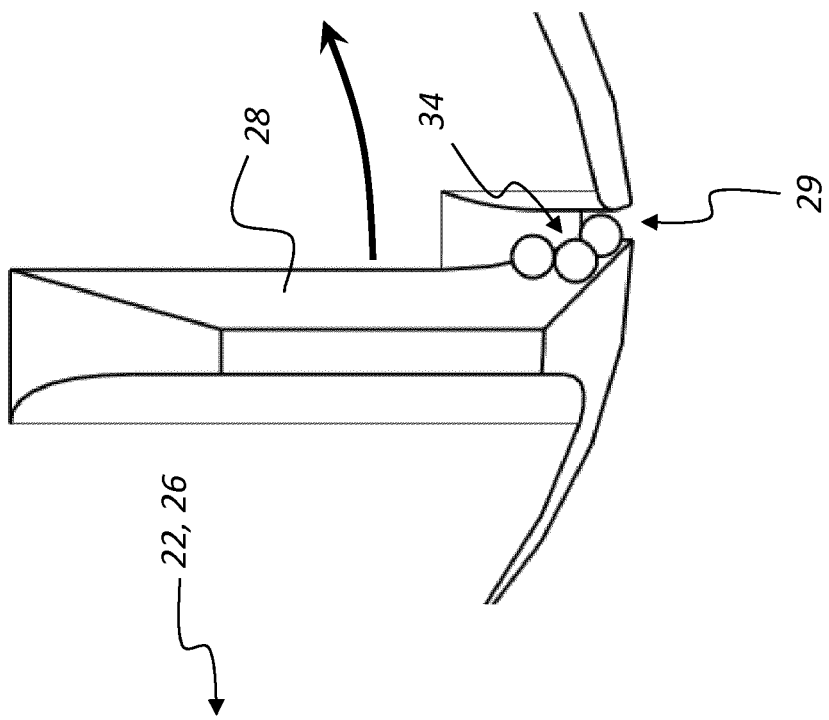
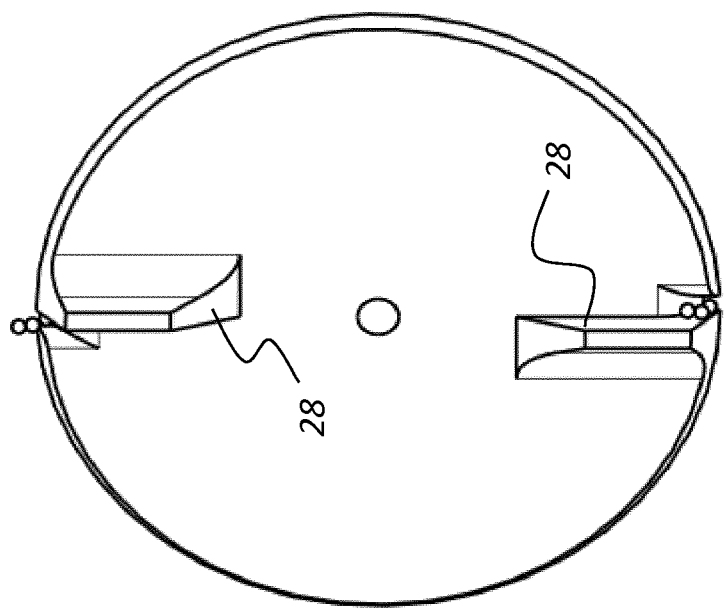

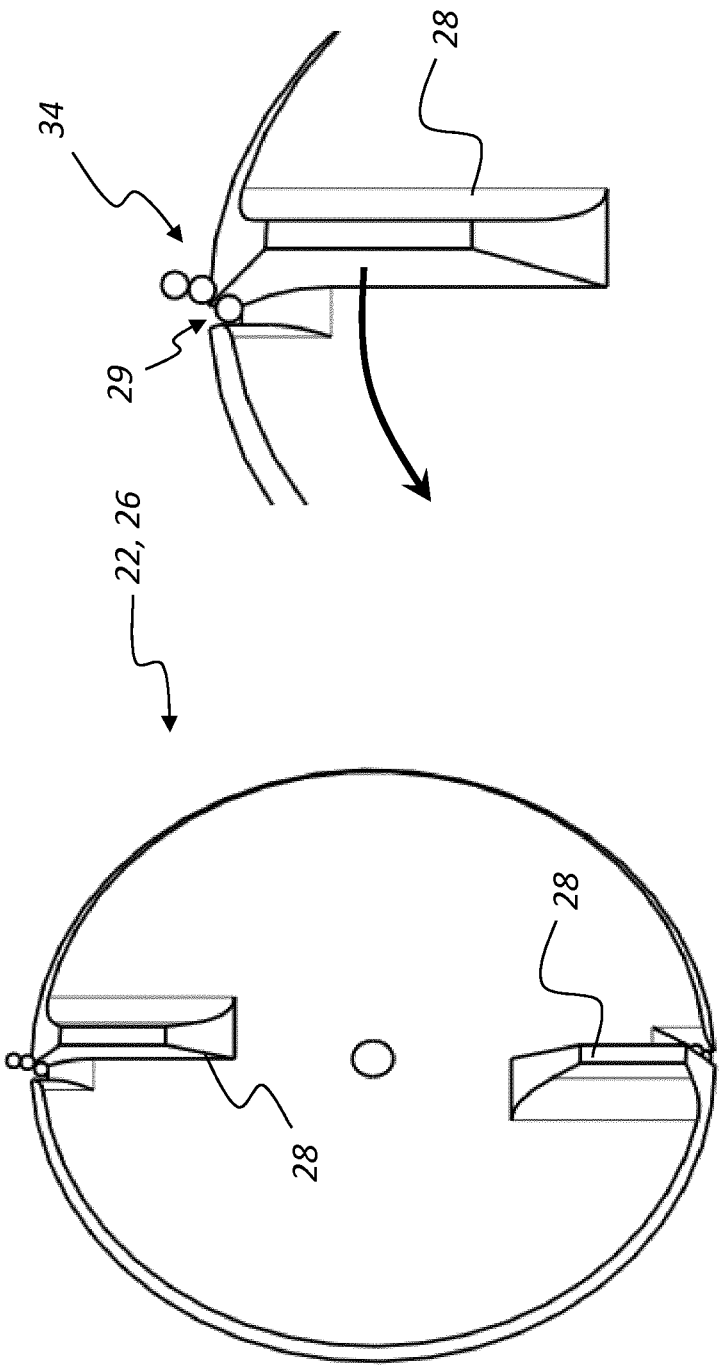

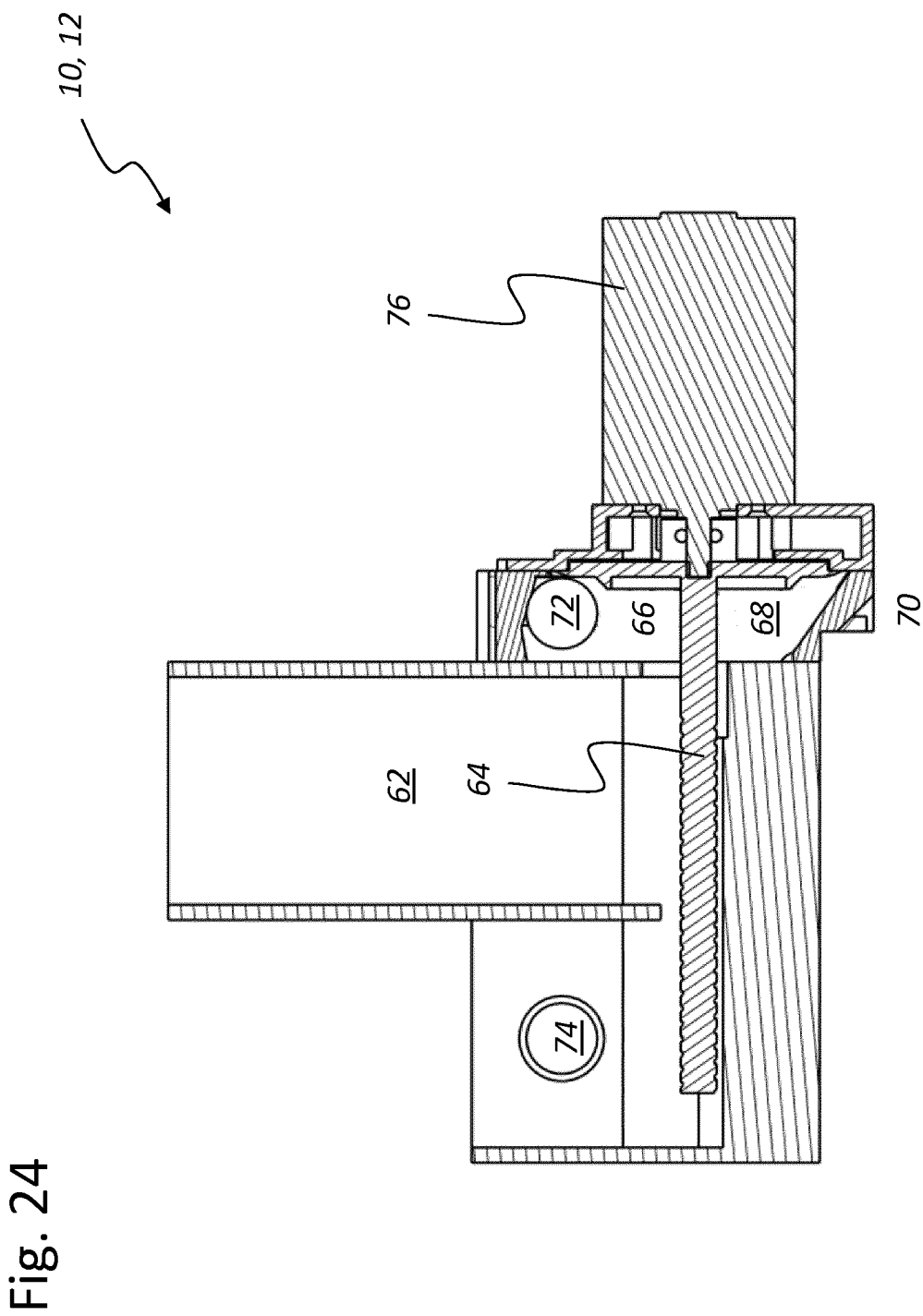

DISTRIBUTION UNIT FOR GRANULAR COMMODITY, IN PARTICULAR A SOWING UNIT

The invention relates to a distribution unit for granular material such as grains, fertilizer or the like, in particular a seeding unit with the features of independent claim 1.

Distributing devices for granular material such as seed drills in particular are known in numerous design variants. Conventionally, grain is conveyed with the aid of an airflow into which grains are fed. The airflow, which acts as a carrier medium, is then fed to a distributor, which can lead to a plurality of hose lines that eventually terminate at coulters of the seed drill arranged side by side. The metering of the grains enables the volumetric flow of discharged grains to be varied. There are generally no other possibilities for influencing the metering of grains in the individual lines that lead to the coulters. While the grains can be fed regularly into the airflow, the constancy of the grain delivery during the air-supported transport is impaired to a greater or lesser extent, often resulting in the non-uniform deposition of grain at the coulters, which can lead to drawbacks in the spatial arrangement of the individual plants.

One device for rendering constant the flow of material in a seeder or seed drill is known from DE 196 36 787 C 1. The primary purpose of this device is to produce constant spacing of the particle, granulate or grain on a volumetric grain delivery basis, so that the grains can be deposited individually for the most part. The grains are conveyed in a seeding line after the metering unit or in the coulter via a cascade line or conduit composed of channels or a distributing flute via which the particles or grains are separated and lined up through multiple changes in direction. The discharge line is embodied as a multiple-part distribution line whose individual line elements are each arranged obliquely to each other such that the individual particles are arranged in succession by the influence of gravity and flow out in a zig-zag pattern, with at least the end line element having a channel-shaped cross section.

Moreover, a device that can be used universally for different grain sizes and seed types for the separation and discharging of granular material, particularly an individual grain seeding device, is disclosed in DE 36 33 955 A 1. For this purpose, a rotating narrow hollow cylinder with cell-forming recesses on its open front side, a stationary outer cover and a covering ring arranged within the hollow cylinder are proposed. A reservoir is separated by a wall from the hollow cylinder that has an opening to allow a limited quantity of material to be separated to pass through. One length of the cell-forming recesses is intended to be twice or multiple times the length of the grains to be separated. In addition, a suction opening is provided in the vicinity of a rear delimiting surface of the recesses. The quickly rotating hollow cylinder takes up several grains per recess from the grain supply, the outer cover covering the recesses in the filling zone and preventing the grains from falling out. Centrifugal force presses the grains into the recesses, while a brush scraper removes excess grains that fall back into the reservoir. As the hollow cylinder continues its motion, an outer delimiting wall ends, so that grains not held by suction in the recesses are discharged outwardly through centrifugal forces and fed back to the reservoir. An additional pneumatic scraper can support this separation of grains. At the delivery site, the suction is cut off, so that the grains are delivered from the recesses by centrifugal force and gravity.

In addition, DE 3822437 A1 discloses a bulk conveying device for such individual grain seeding devices that is intended to ensure that excess bulk particles are removed from the recesses and diverted in such a way that they are fed completely to the bulk reservoir.

A further individual grain metering device for sowing grains is known from DE 41 16 724 A 1. In this known metering device, moving spoon-shaped separating openings are formed for the accretion of individual grains through a thin-walled lateral surface of a rotating cylinder that is open to one side. The spoon-shaped openings overlap with a slot in the housing enclosing the cylinder, through which suction openings for suctioning and individually transporting the seeding grains are formed.

EP 0 636 306 A 1 finally discloses a distribution unit for granular material such as seeds. The distribution unit comprises a housing with a circular inner circumferential surface, an inlet opening for granular material, a conveying device for the granular material rotating concentrically in the housing, as well as an outlet opening. The conveying device has several openings at its outer region, which form a pocket in a first housing region with the housing inner circumferential surface, into which the grains are urged and circularly conveyed by means of centrifugal forces supported by the conveying device. The inlet opening opens into a second housing region. The first housing region and the second housing region are separated by a fixed contoured disc. The disc's contour is to provide for excess grains being stripped off. Such grains are available for further conveying.

The known metering devices are either modified individual grain seeding units that enable precise separation of grains but are limited compared to volumetrically metering seed drills in their processing capacity and in their grain flow volume, and/or they are elaborate and prone to faults due to their construction and function. On the other hand, the add-on devices that have come to be known which are intended to improve the regular delivery of the seeding grains in volumetrically metering machines do not approach the separation quality of conventional individual grain seeding units.

The primary objects of the invention are to improve discharge accuracy and/or grain spacing for volumetric grain conveyance insofar that the grain metering comes close to—or ideally matches—individual grain metering with respect to its separation quality, while simultaneously facilitating a high grain volume flow with a simple and ordinary structure and a simple function as it is characteristic for volumetric metering seed drills.

These mentioned objects of the invention are achieved by means of the subject matter of the independent claim. Features of advantageous further developments of the invention follow from the dependent claims. To achieve the mentioned object, the invention suggests a distribution unit for granular materials such as grains, fertilizer or the like, which can be particularly employed as a seeding unit of a distribution machine or seed drill. The distribution unit according to the invention comprises a housing with an approximately circular and/or circle-segment shaped inner circumferential surface, into which opens at least one inlet opening for conveyed granular material or conveyed grains. A conveying device for the conveyed granular material or the conveyed grains rotates concentrically in the housing. An outlet opening for discharging the separated granular material or the separated grains is approximately tangentially connected to the inner circumferential surface. The conveying device rotating concentrically in the housing has one or more openings and/or recesses—e.g. in the form of grooves or ridges or the like—at or near its outer circumference, which groves or ridges form a pocket in a first housing and/or conveying region with the housing inner circumferential surface into which pocket the grains are urged on their conveying path along the inner circumferential surface of the housing. Conveyance of the grains in such pockets is implemented approximately circular by means of the support of centrifugal forces and is supported by the conveying device, wherein the grains are simultaneously lined up and separated from a disorganized conveying stream. In a second region, connected to the first conveying region in the housing, which second region functions as separation region, only one grain continues to be conveyed by means of a modified contour of the inner circumferential surface of the housing, whereas excess grains are isolated and conveyed back to the first housing region for re-conveying. Such separated grain conveyance is implemented in the second conveying or separation region under the influence of centrifugal forces and by means of the support of the shape of the conveying device, which has openings or steps or ridges at its outer circumference, which facilitate entrainment of only one grain, respectively, by the rotating conveying device.

For the distribution unit according to the invention, the inner circumferential surface of the housing and the conveying device, individually or working together, form an at least two-sided axial guide for the individual grains, which guides each conveyed grain axially, while it is being pushed by the conveying device and with the support of centrifugal forces, which are larger than the gravitational force. In doing so, it can be provided that—at least on one side—the axial guide track is reduced in height at one location and/or is tapered in its cross section, which forms a clearance, into which entrained, excess grains are urged by means of centrifugal forces, so that just one grain, respectively, remains in the desired guide track, which causes the desired grain separation. A clearance can exist, at least on one side of the axial guide track, into which entrained, excess grains are urged outwardly away by means of centrifugal forces, beyond the conveying circle so that only one grain, respectively, remains in the conveying element. The urged-aside grains are collected and can be entrained and separated during further rotations of the rotating conveying device, if required. The pushers, ridges, receiving pockets or grooves of the conveying device form a conveying pocket together with the inner circumferential surface of the housing, wherein the circumferential surface transitions from a wide to a very narrow region, so that the narrow circumferential surface width only offers sufficient guidance for one grain to be conveyed.

The distribution unit according to the invention can optionally also be provided with the axial guide track being narrowed or reduced in width at least on one side, whereby a clearance is formed outwardly with respect thereto. Such clearance in particular, has the form or shape of a radial extension. Into such clearance or radial extension, excess grains can be urged by means of centrifugal forces based on the contour and dimensioning of the clearance, which results in only one grain, respectively, remaining in the narrowed, desired guide track during the further course of conveyance along the track. In doing so, the contour and shaping of the narrowing guide track achieves an ideal grain separation.

For the distribution unit according to the invention, the grain flow of the conveying device is tangentially conveyed through the respectively designed inlet opening and leaves the housing, again, in tangential direction. That means that the grain flow is tangentially conveyed to the housing, where it rotates around the rotational axis and subsequently leaves the housing tangentially. During rotation of the conveying device there are virtually no stationary grains and no noteworthy grain inventory in the housing. Aside from the separated grains discharged through the outlet opening, there are some excess grains or grains from the grain flow in the housing, which were separated during the separation process, which remain in the housing for one or more rotations to close conveying gaps. In doing so, such grains generally rotate around the axis of the housing and do not interfere with the overall conveying and/or grain separation process based on their mixing with re-conveyed grains. The excess grains are conveyed to the inflowing grains, and are subsequently urged into the conveying element because the inner circumferential surface is inclined towards the conveying element.

Grain flowing towards the conveying device can glide along the circumferential surface prior to and during intake. The circumferential surface preferably forms an almost coaxial shape towards the conveying element, wherein the grain flow towards the intake conveying element is virtually aligned. The separation of excess grains can be implemented unilaterally or bilaterally.

The inner circumferential surface of the housing can be adapted to the respective grain shape. Further, the opening of the conveying device can also be adapted to the respective grain shape. Consequently, different housing designs and dimensions of the effective conveying surfaces are possible depending on the grains to be discharged or their contours and/or grain sizes. The rotation speeds of the rotating conveying device can also be adapted to the respective conveying demand for different contours and/or sizes.

Grain conveying can optionally be implemented per conveying airflow or from the grain storage container. A through-conveying of the grains can also be ensured for a stationary conveying element. In doing so, conveyance must essentially be implemented by means of the carrying airflow.

The drive of the conveying element or the conveying device can be implemented both by electric motor, hydraulically, pneumatically and by means of the conveying flow itself. Conveying back of the excess grains can also optionally be implemented pneumatically or mechanically.

Below, some aspects of the present invention can be found, again, in summarized form, particularly under structural aspects. The distribution unit according to the invention comprises a housing having an approximately circular and/or circle-segment shaped inner circumferential surface, at least one inlet opening for an airflow for granular material or grains conveyed therein, a conveying device concentrically rotating in the housing for the granular materials carried in the airflow or the grains conveyed therein, as well as at least one outlet opening, which connects approximately tangentially to the inner circumferential surface. In particular, the conveying device can be a disc rotating in the housing with at least one step, groove, recess or the like to entrain granular material or grains. The inner circumferential surface of the housing further preferably has a groove-like structure at least near the outlet opening, the dimensions of which correspond to the size of the separate grains. Because the distribution unit according to the invention is supposed to be capable of processing and discharging differently shaped grains and, in particular, grains of different sizes, the groove-like structure can be shaped differently, as well. If, then, the dimensions of the groove-like structure are to correspond to the size of the individual grains, this can be achieved, among other ways, by providing different rotating conveying devices or discs of different size and contour, which can be exchanged as needed and depending on grain size. Optionally, it is also useful to exchange parts incorporating the separation groove during a change of seed types, if this can be easily accomplished.

Optionally, the grains can also be guided into the separation apparatus in a pure mechanical way, entrained by the conveying device and separated and subsequently discharged through the outlet opening by means of centrifugal forces. For such a variant, the drive of the rotating conveying device, in particular, can be implemented by means of an electric motor.

The various variants of the distribution unit according to the invention provide for a tapering of the groove-like structure in the direction of rotation of the conveying device in the direction towards the outlet opening, creating space for only one single grain therein, which leaves the housing through the outlet opening, whereas adjacent, excess grains are guided past the outlet opening by the entrainment step and are kept in the housing. If a tapering of the groove-like structure in the direction of rotation is being discussed in this context, this generally pertains to a stepped and sudden tapering or a gradual and smooth tapering. In the first region, the groove is relatively wide for filling and can accept several grains. In the subsequent regions, the width of the groove-like structure corresponds to the size of the grains. Such gradation in the structure results in excess grains being reliably stripped off and only one single grain being further transported to the outlet. In general, the shape and contour of this transition region is not precisely defined because the useful and necessary contour can be determined by the respective gliding and rolling properties of the various grain sizes and forms.

Thus, a single grain can leave the outlet opening with a defined discharge speed and direction per rotation of the conveying device because the groove-like tapering of the inner circumferential surface opens into the outlet opening approximately tangentially in the direction of rotation of the conveying device. It may be useful, if applicable, to provide for a small step in the discharge region, which opposes a resistance as low as possible to the grain jumping off. To be able to implement an easier change of seeds, it is useful to exchange parts of the separation groove. For such an exchangeable separation groove, which can be inserted as part of the housing into the inner circumferential surface, a slight gradation may be unavoidable under the circumstances, which gradation, however, must be so small that the discharged grain can glide over the same without any problems and can be conveyed to the outlet without getting stuck or experience an undesired deviation.

Preferably, the at least one step protrudes from a flat, curved or otherwise structured front side of the disc-shaped conveying device and has a width, which can accept or support several grains. The conveying device can optionally have two, three, four or more entrainment steps, which are shaped similarly or differently, and which are spaced apart at respective equal distances from one another over the flat, curved, or structured front side. Reference is made to the fact that the effective surface of the separation disc does not mandatorily have to be flat but can be curved or wing-like, as the circumstances require. The disc-like conveying device or rotating disc, for example, can have so called freeform surfaces. Further, the surface of the disc pointing towards the grains can also be slightly curved in the conveying direction of the entrainment step, forming a shovel-like contour. In doing so, it can be achieved—particularly for elongated grains—that such grains do not stand up but fall to the front into the groove and can be conveyed reliably. Further reference is to be made to the fact that the outer edge of the rotating conveying device or disc does not have to be flat or cylindrical, at all, but can be provided with prongs or notches. The disc or conveying device, for example, can have the outer contour of a rotating saw blade or the like, the radius of which is not constant so that the circumferential surface does not have a regular and continuous cylindrical shape, either.

One alternative embodiment of the distribution unit can provide for the conveying device to be driven by an electric motor. In the alternative, the conveying device can be driven by the airflow guided into the housing through the inlet opening. A further alternative embodiment, for example, can also be provided in which such drives are omitted so that only the dynamic pressure of the grains conveyed into the distribution device facilitates the drive of the conveying device or disc, which simultaneously maintains the approximately equidistant discharge of the grains.

The groove-like structuring of a section of the inner circumferential surface of the housing, which section connects to the radial outer edge of the disc-like conveying device, connects the inlet with the outlet opening and in doing so, tapers off, so that the grains carried by the airflow pass the inlet opening, are organized and evened out by the airflow and the rotating conveying device in connection with the tapering structure of the inner surface of the housing, and subsequently leave the outlet opening as a largely uniform flow of grains. The contouring of the corresponding effective surfaces of the housing and the rotating disc facilitate an evening out of the material flow (of grains, seed grains, etc.) in connection with the uniform airflow and design of the inner circumferential surface of the housing, which causes an equidistant discharge at the outlet, which, in turn, can provide very uniform grain separation with the discharge speed and discharge direction to be evenly and precisely maintained. By means of the inflow of a uniform, slightly pulsating airflow, if applicable, with an approximately constant volumetric flow of air and entrained grains—into the interior of the housing with the conveying device rotating therein—a functioning single grain seeding unit is provided, where the grains are separated and discharged in uniform spacing from another through the outlet opening.

A central shaft of the conveying device, for example, can be driven by an electric motor. Optionally, the central shaft of the conveying device can also be driven via the airflow guided through the inlet opening into the housing. Preferably, the disc is driven by an electric motor, wherein, in the interest of a constant and equidistant grain discharge, a modulation of the output speed is not desired but only an adjustment to the speed of the associated carrier machine (e.g., the seed drill).

In addition to the distribution unit, the invention also comprises a multi-row distribution machine for granular material such as grains, fertilizer or the like, in particular a distribution machine or seed drill, which has several distribution units arranged next to one another according to one of the previously described alternative embodiment.

Below, various aspects of the invention once again can be found in summarized or modified form, which is to better explain the function and operation of the unit according to the invention. The distribution unit according to the invention, which is explained in different exemplary embodiments, serves to discharge granular material, such as grains, fertilizer or the like. The distribution unit in the present context particularly serves as sowing unit of a distribution machine or seed drill and is therefore generally described as a sowing unit in the context of the description of the invention. The distribution unit or sowing unit comprises a housing with an at least semi-circular and/or circle-segmented inner circumferential surface and an inlet opening for an airflow and granular material or seeds conveyed therein. Further, the unit comprises a conveying device rotating concentrically in the housing for the granular material being carried in the airflow or the grains conveyed therein as well as an outlet opening, which connects to the inner circumferential surface approximately tangentially and discharges the grain or the granular material substantially evenly to a seed line, a conveying line or the like. The conveying device, for example, can be formed by means of a disc rotating in the housing, which disc can have at least one step or entrainment step, optionally, however, can have two or more entrainment steps or recesses regularly spaced apart from one another to entrain granular material or seeds.

The grains carried in the airflow are conveyed through the tangentially curved inlet in the direction of the outer circumference of the rotating entrainment device or the rotating conveying device into the interior space of the housing, in which the rotating disc or the conveying device form a type of metering device for the equidistant discharge of grains in the direction towards and out of the outlet. The airflow first facilitates that the grains move along the inner circumferential surface and first move along the curved wall surface, which transitions tangentially into the interface region between housing and disc. Because the inner circumferential surface of the housing has an inclined surface or an otherwise shaped groove-like structure over the course of further movement in the direction of the outlet opening, the measurements of which approximately correspond to the size of the separate grains, the grains are urged between the wall surface along the inclined housing surface and in the direction of the outlet opening towards the sowing disc, in the course of further movement, where, however, only one single grain, respectively, can find space between the step and the inclined housing surface. Such grain conveying within the housing is also facilitated and achieved, in that the groove-like structure or inclined housing surface taper off in the direction of rotation of the conveying device or the disc in the direction of the outlet opening. Moreover, because the groove-like tapering of the inner circumferential surface in the direction of rotation of the conveying device opens tangentially into the outlet opening, separate grains are discharged, respectively, in regular intervals through the outlet opening.

The conveying direction of the grains is predefined in that they enter with the airflow through the inlet opening perpendicular towards the bottom into the housing, and are guided there on the wall surface of the inner circumferential surface, which is sloped towards the bottom, and are conveyed in the direction of the inclined circumferential housing surface. In this phase, the grains are entrained by the entrainment devices or ridges of the disc of the conveying device, are separated in the course of the conveying path and discharged towards the bottom through the outlet. The grains are simultaneously pushed by the housing wall toward the seeding disc. In doing so, the entrainment device or the entrainment step, which protrudes from the front side of the seeding disc, pushes the grains in the direction of the rotation of the disc. A first grain can immerse a little deeper into the seeding disc due to the geometry of the surfaces engaging with one another, whereas the remaining grains are urged outwardly and settle a little further outwards or move around in an undefined way. The conveyed grains are pushed by the seeding disc or the entrainment step and are in contact with the inner circumferential surface of the surrounding housing at two locations. Because the wall surfaces of the housing are stationary with respect to the rotating disc, the grains are furthermore constantly moved around and caused to rotate in an undefined way, by means of which attached grains can more easily detach and the conveyed grains are isolated from these remaining grains.

An ejection region begins in the further course of the inclined housing surface, in which region the housing contour changes in so far as only a narrow ridge section guides the grain. The grains located further to the outside, however, fall outwardly through the narrow ridge section based on centrifugal forces and based on the lack of a radial guide. After leaving the seeding disc, these grains are urged outwardly and conveyed back into their flow region via a ramp section of the inner circumferential surface in the direction of the inlet opening. Such axial diversion of the grains not being discharged through the outlet opening is important to create sufficient free space for the outlet opening. The grain conveying regions of the housing may also be referred to as the filling region and the separation region. In the filling region, the entrainment ridges of the separation disc are still in the filling region. In the filling region, a grain is deeply embedded in the disc and the groove of the wall surface, whereas two further grains are also urged towards the separation chamber based on the inclined contour. If the disc has continued to rotate in the direction of the separation region, the grains are precisely separated. In doing so, the separated grain is further conveyed into the narrower groove, whereas the excess grains are conveyed back laterally past and beyond the conveying circle via a slope.

It must be added that there are grain shapes, where several grains, respectively, embed into the disc or can lay in the groove of the housing. With the elongated shape of wheat gain, such grains can displace one another until only one grain remains in position. Such grains can also be separated by means of the unit according to the invention.

As mentioned, the outlet opening tangentially connects to the inner circumferential surface, for most of the embodiments of the distribution unit. Their relatively large opening cross section is important to be able to also discharge undesired foreign objects such as straw parts or the like, which are carried along in the airflow. The outlet opening can be arranged at the bottom side of the housing.

The rotating seeding disc operatively engages with the housing wall surfaces by first urging the grains towards the housing wall by means of the speed-induced centrifugal forces. The sloped housing wall ensures that the resulting centrifugal forces direct the grains in the direction of the seeding disc. In the ejection region, the housing surface slopes in the opposite direction, which causes the excess grains to be pushed and thrown off away from the seeding disc.

The further course of grain conveyance provides for the discharge of grains from a circular path of the separation disc in tangential direction into an opened curve with a larger and still further opening radius in the further course of conveyance, which can finally open into a seed line, a downpipe or the like to discharge the grains into the soil. The shape of the course of movement of the curve strongly depends on the rotation speed of the disc. If the metering device runs relatively slowly, this results in an arc-like or curved course of movement because in doing so, the grains are carried more evenly. If the metering device runs faster, however, the discharge direction can be almost straight. In doing so, the discharged grains can have an approximate straight course of movement, depending on the discharge speed, especially as the distance between the separation disc and the coulter can be very short, so that the discharge curve can show an approximate straight course of movement.

The effect of the entrainment steps can be based on the fact that they serve as separation aids. In doing so, the grains can be easily moved during the rotation of the separation disc due to a depression in the housing. The possibility of double occupations is more easily resolved thereby, so that only one grain is discharged, throughout.

Grain conveyance is essentially implemented altogether in three phases. In the first phase, the grains are carried by the air. In the second phase, the grains are mechanically pushed, whereas in the third phase, they are discharged, again, by air. The third phase is normally in a straight line, but can also have a curved course of movement, if required. Whereas only the airflow takes care of grain conveyance in the first and third phases, with a very low prevailing friction, grain conveyance in the second phase is characterized and dominated by the mechanical aspects with a high friction ratio. In doing so, it can be achieved that the grains are conveyed from an airflow dominated transport in the first phase into a mechanically dominated and mechanically pushed transport in the second phase within the housing, and from there again into the airflow dominated transport in the third phase, although almost the same volumetric flow prevails in all three zones. It is decisive for such function that the grains are urged radial outwardly to the housing wall. This causes a strong deceleration by means of the increased friction towards the wall, achieving additional slowing by means of slight jamming of the grains into the inclined housing surface. Therefore, the rotating element—the disc—can push and sort the grains, although partially high air speeds prevail around the disc. Admittedly, the transport airflow is always present and passes through the housing through the inlet opening and the outlet opening; the transport of the second phase, however, is temporarily transferred to the mechanically rotating element—the conveying device or the seeding disc. The discharge of the grains through the outlet opening into the down pipe or the seed line can therefore be implemented very evenly because the grains have not left the actual airflow but are merely mechanically supported.

Because the grains are already enclosed by a strong airflow while they are still at the separation disc, they can be transferred to the down pipe very evenly. Prior to and after discharge, the flow direction of the air is identical to the grain flow. Although the transport air is inside the metering system, no grains are swirled around. Rather, the grains are pressed against the inner circumferential surface of the housing by means of centrifugal forces so that separation of the grains can be achieved at the housing wall.

Optionally, the disc can be designed differently from the above description so that the disc can have a front-faced fitted with entrainment steps, for example, which are combined with recesses or rectangular grooves, which are arranged immediately at a step adjacent to the outer circumference of the disc and are dimensioned so that one grain, respectively, finds space in the grooves, whereas further grains are indeed conveyed by the entrainment steps, but are pushed away during the further course of the conveying device and conveyed back to the collection reservoir in the housing. This method of grain separation is supported by centrifugal forces of the fast rotating conveying device, which—together with the design of the inner circumferential surface of the housing—takes care of the fact that only the separated grain located in the groove is conveyed on to the outlet.

The filling region can extend relatively far upwards, almost to the upper zenith of the circular grain movement and transitions into the separation region, where excess grains are pushed toward the top and outwardly away from the rotating disc so that each of the entrainment steps only conveys precisely one grain in the direction of the outlet opening. The wall surface of the housing has a distinct step in the transition between these regions (filling region towards separation region) so that the wall surface extends outwardly in a step in the direction towards a larger diameter and forms a grain discharge space, into which the grains—initially conveyed by the entrainment step—can glide along the wall surface. Only the one grain to be separated remains against the entrainment step of the rotating disc and is conveyed by such disc, now, however, below the grain discharge space on a smaller radius of the housing, where the grain is individually transported in a grain guiding groove or grain guiding edge, which is triangular shaped in its cross section, until it is discharged in a mostly circular course of further movement or in a movement opening in a curve, in the direction towards the outlet opening.

The distinct grain guiding edge in the housing can have the contour of a depression, for example. The grain guiding edge or groove in the grain guiding inner circumferential surface of the housing in the separation region is indispensable for the separation effect of the distribution unit because otherwise an undefined amount of grains would be pushed by every entrainment step through the housing into the direction of the outlet, which would significantly impair if not destroy the desired function and mode of operation of the apparatus.

The size and contour of the optional grooves, which border the entrainment ridges, respectively, are aligned with the grain shape and grain size to be handled, respectively. Optionally, the disc can also have a saw-blade-like contour, the outer circumference of which has a plurality of entrainment steps, which have the contour of saw-teeth, respectively.

Disc variants with a larger number of entrainment steps can be useful, particularly for separation and seeding of rapeseed. The grains are first picked up by the entrainment steps of the rotating disc. In doing so, the entire filling region is positioned upstream of the grain discharge space, which gradually opens outwardly into the separation region, where those grains, which are not conveyed separately in the grain guiding groove, which is narrowly situated at the outer circumference of the disc, are discharged outwardly and conveyed in the direction of a re-conveying region through their rotating movement. These grains, which pass to the re-conveying region, are conveyed, once again or repeatedly, if required, to the filling region and can be re-entrained by the disc and caused to rotate. The flat grain discharge space transitions into a rounded ramp in the re-conveying region, which ramp opens into the housing inner space and forces the grains into a movement, which guides them away from the outlet opening and re-conveys them into the filling region in the housing. Therefore, the ramp forms a type of re-conveying flow slope for excess grains, with the help of which these grains are re-conveyed into the housing and fed into the filling region.

The grains are picked up by the entrainment devices in the filling region, wherein an individual grain deeply embeds into the disc and two other grains are also urged into the separation chamber or grain guiding edge due to the inclined contour. The separated grain is conveyed in the narrowing groove or gouge in the separation region, whereas excess grains are re-conveyed laterally past and beyond the conveying circle via the ramp and the slope.

The grains located outside of the grain guiding groove and conveyed in the separation region in the grain discharge space are guided via the ramp into an inclined direction with respect to the surface of the disc and, in doing so, are guided away from the individually separated grains, which are discharged from the housing through the outlet opening towards the bottom. These grains conveyed over the ramp, end up in the filling region, again, and do so several times, if required.

The re-conveying region can open into a wider slope, particularly via a ramp without a step, i.e. of rounded contour, which slope finally intersects with a further slope, which extends approximately vertically from the upper inlet opening and through which grains are conveyed through the inlet opening into the inner housing. In doing so, re-conveyed, excess grains as well as grains newly entering through the inlet opening can be merged. The grains are separated into two groups in the separation region, i.e. separated grains, which are discharged towards the bottom, and excess grains, which remain in the housing. In doing so, the excess grains are conveyed via a slope (re-conveying region) past the discharge of the separated grains. New grains flowing into the seeding machine reach the housing via the inlet opening and meet the excess grains from the re-conveying region in the inner housing. The newly conveyed and excess grains are conveyed past the outlet opening via the slopes or inclined housing surfaces. Subsequently, the grains are urged to the separation disc, again, based on the inclined contour of the housing inner surface.

In the course of their movement, the grains move axially and radially away from the disc and then, again, back towards it. Therefore, the course of movement of the grains is as follows: excess grains are radially and axially conveyed away from the separation disc; subsequently, the grains are guided past the outlet channel for discharge of the separated grains and, in doing so, are radially re-conveyed to the separation disc; finally, the grains are axially conveyed to the separation disc, yet again.

For separation of peas, the separation disc can have three entrainment steps, offset by 120 degrees, respectively, towards one another and corresponding grooves, wherein the steps should be designed to be relatively flat, the grooves, however, should be designed to be relatively large. A variant, particularly suitable for the separation of wheat grains, however, can have a total of eight entrainment steps and corresponding grooves evenly distributed over the disc front surface, for example, wherein the steps, again, are designed to be relatively flat, in this case, and the grooves, however, are designed to be relatively large. A plurality of steps and grooves can be arranged at the disc front surface of the discs particularly provided for the separation of rapeseed, which steps and grooves facilitate a relative slow rotation of the disc but with sufficient conveying capacity.

A further variant of the metering system or distribution unit according to the invention can be provided with an approximately horizontally extending inlet opening, which also opens tangentially into the inner circumferential surface of the housing, as explained for the above variants. The inflow opening is located at a location deep inside the housing, which can impart a circular movement onto the grains prior to or during entering the housing. Therefore, it can be ensured that the grains remain and are guided at the wall and reach the separation disc as far outwardly as possible. The outlet opening located at the bottom of the housing can also open perpendicular towards the bottom, in this variant.

The airflow is conveyed along the disc in tangential direction for this variant, as well, wherein there is provided a filling side downstream of and an outer side upstream of the separation disc. The airflow enters through the inlet opening into the housing and flows around the metering device, first in an enclosed channel as well as subsequently into an open channel, after which follows final conveying into the separation disc. As with the previously mentioned embodiments, the grains are urged against the separation disc and are pushed to the discharge via a ridge section. The remaining grains on the conveying side reach the outlet flow, again, based on the contour of the ridge section.

A further alternative embodiment of the distribution unit or seeding unit according to the invention can facilitate distribution of the grains optionally without the carrying airflow, as well. The distribution of the grains is implemented in a purely mechanical way. The seed is conveyed from a container. Subsequently, a conveying screw, which is driven by the separation disc, transports the grains to the separation chamber. The grains are separated in the separation chamber, wherein a portion of the remaining grains remains directly in the chamber and is re-conveyed to the separation disc beyond the outlet opening. A portion of the excess amount is transported in parallel to the beginning of the screw, again, via an excess flow opening, to avoid excess loading. The size ratio of the diameter of the screw compared to the diameter of the separation disc can be very large, as the circumstances require. In doing so, it can be achieved, that despite a slow running screw at the separation disc, a sufficiently high rotation speed can be accomplished. Alternatively, a gear ratio would be possible, as well. The screw and the separation disc for this alternative embodiment are preferably driven by an electric motor, the revolutions per minute of which are variable to be adjusted to the forward speed, grain distance, etc.

The following is to illustrate the exemplary embodiments of the invention and their advantages by means of the appended figures. The size ratios of the individual elements to one another in the figures do not always correspond to the real size ratios because some shapes are simplified and others are enlarged in relation to the other elements for better understanding. FIGS. 1 to 27, for example, illustrate several schematically perspective and detailed views of several embodiment variants according to one distribution unit according to the invention.

Figure 3D:
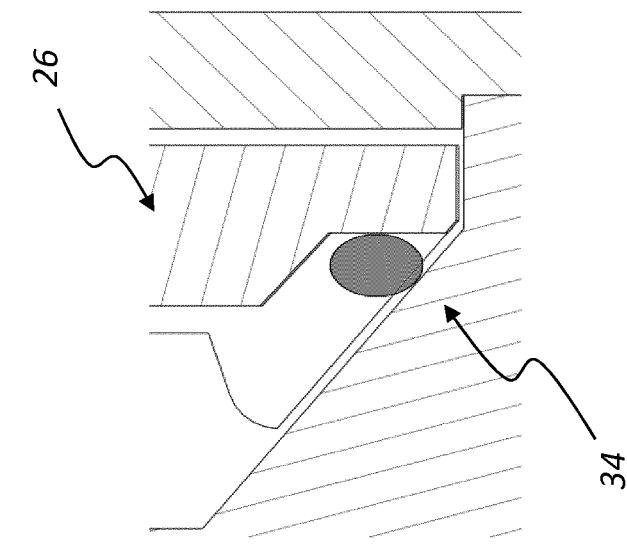

FIG. 3*a*, FIG. 3*b* and FIG. 3*d* each show detailed views of a grain conveying region of the distribution unit.

Figure 3C:
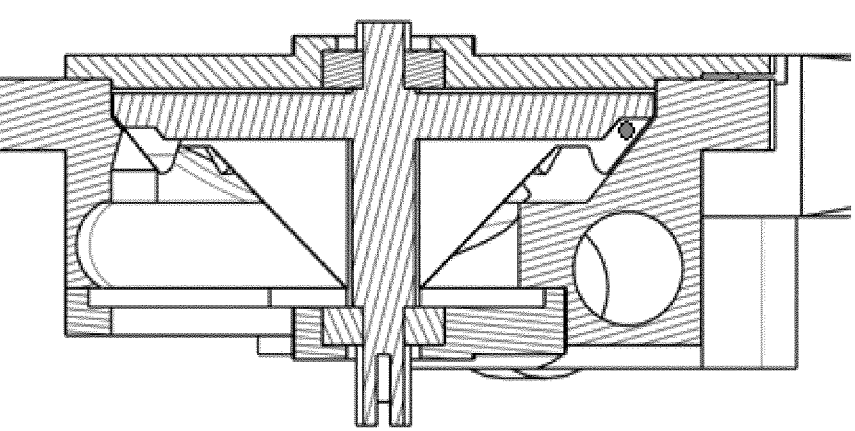

FIG. 3*c* shows a longitudinal section of a possible alternative embodiment of the unit.

Figure 4:
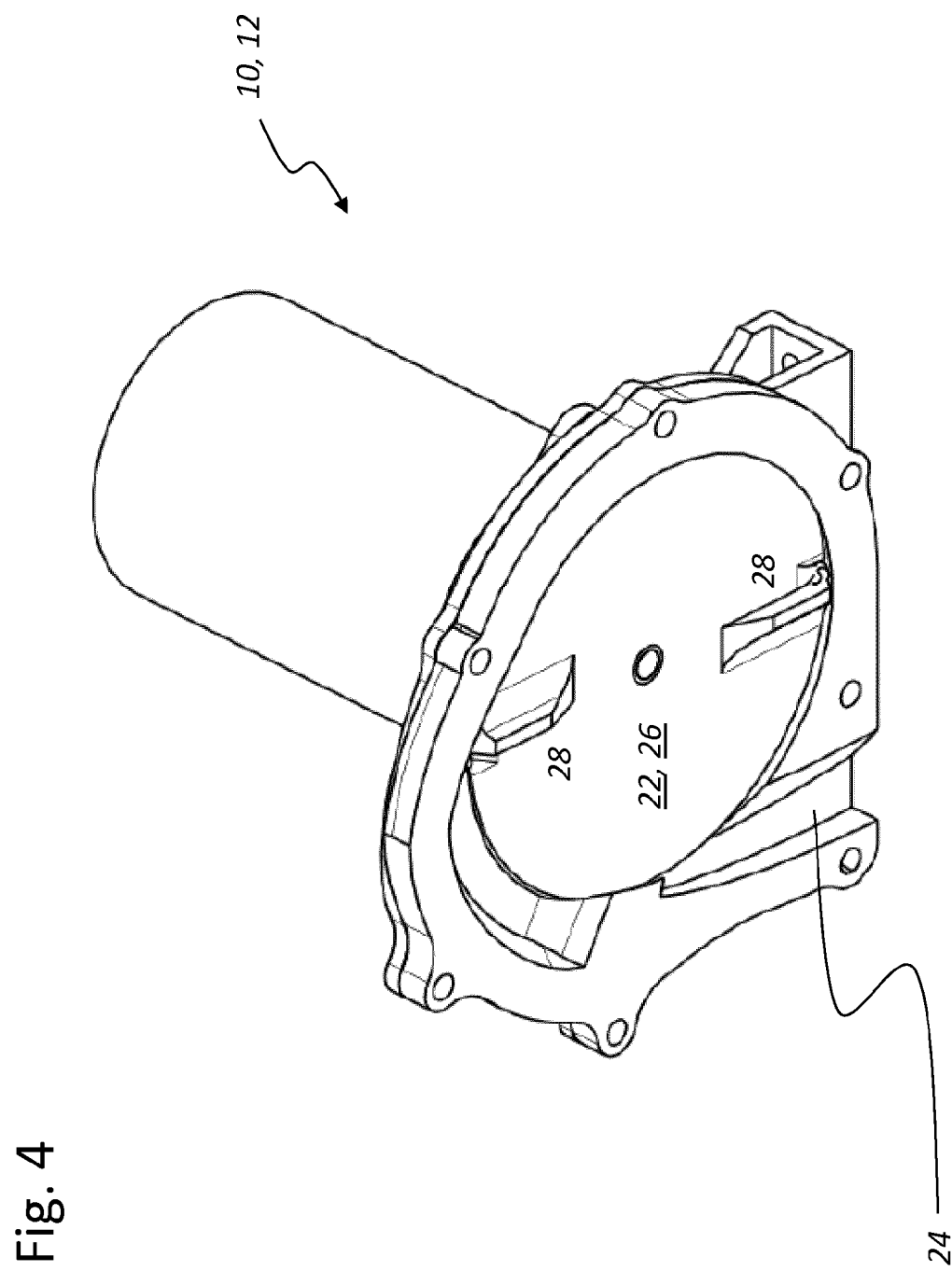

FIG. 4 shows a perspective view of a further alternative embodiment of the distribution unit.

Figure 5:
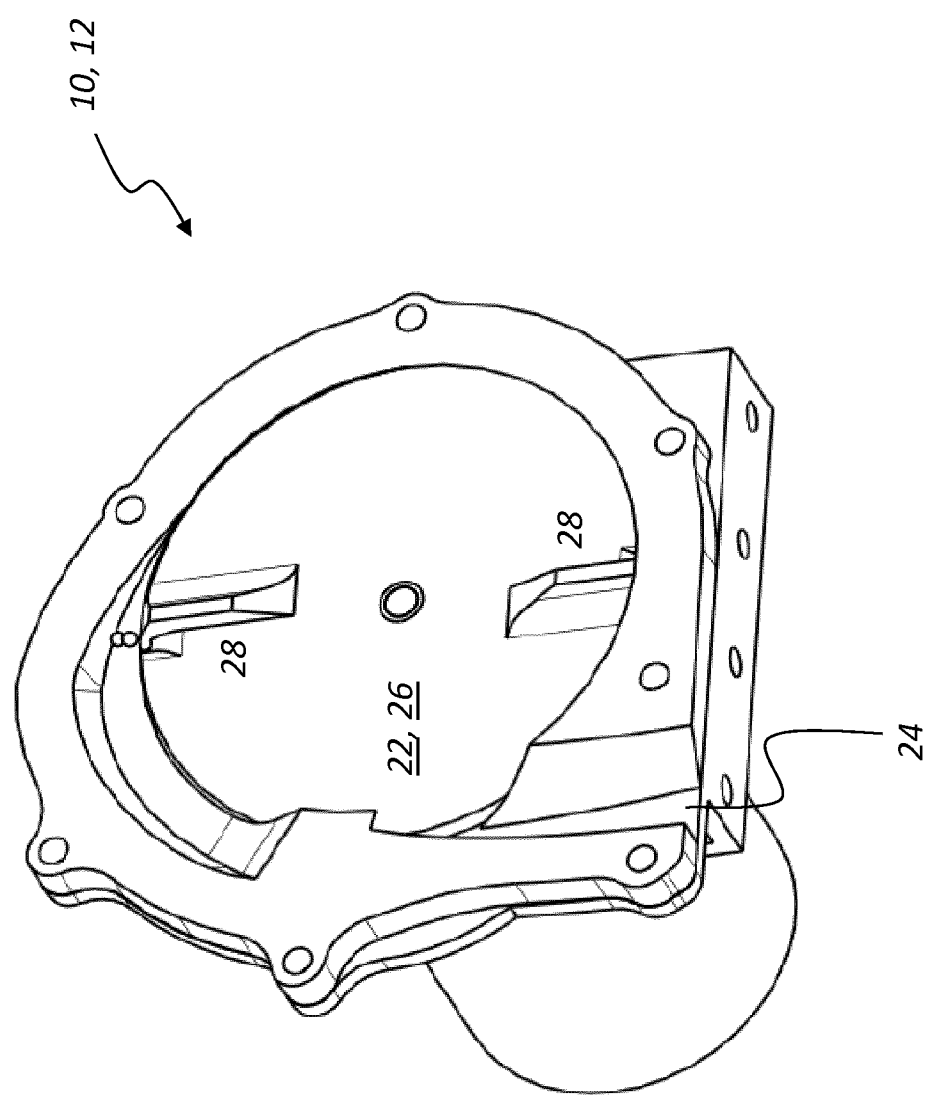

FIG. 5 shows a further perspective view of the unit according to FIG. 4.

Figure 6B:
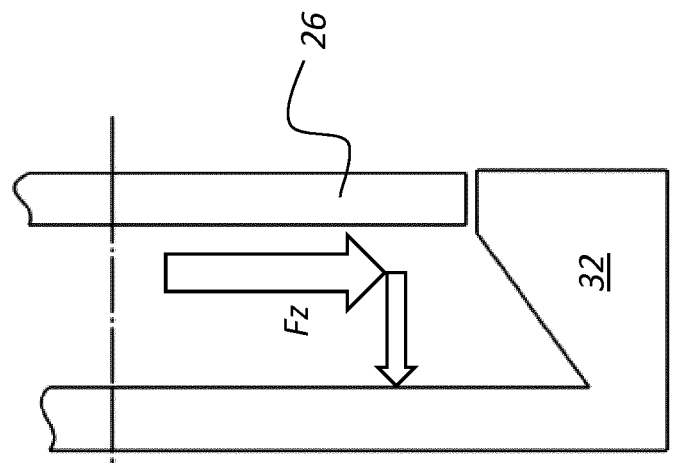
Figure 6A:
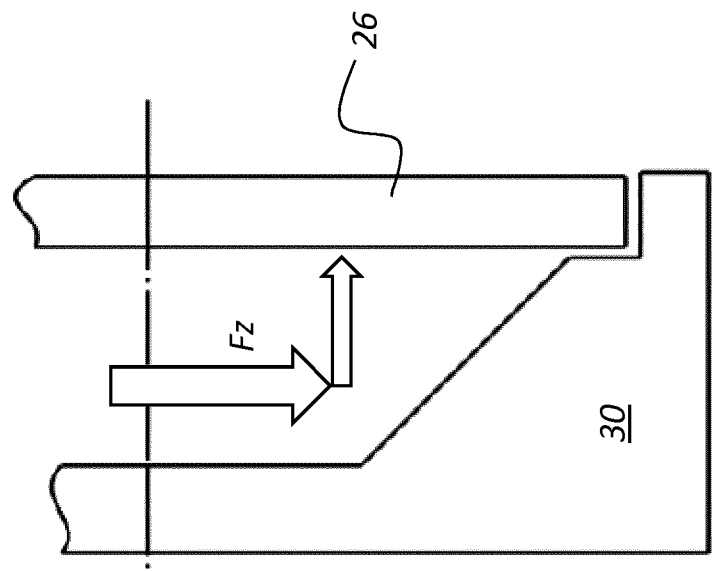

FIG. 6*a* and FIG. 6*b* each show detailed views to make clear the grain diversion of the distribution unit.

Figure 7B:
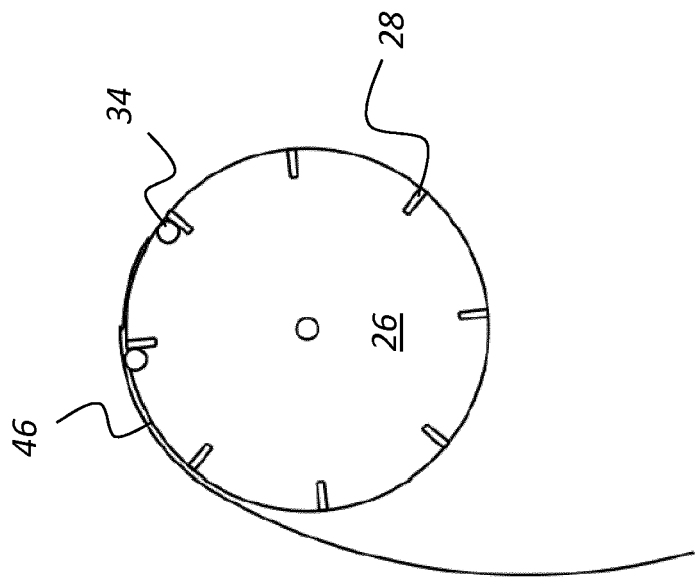
Figure 7A:
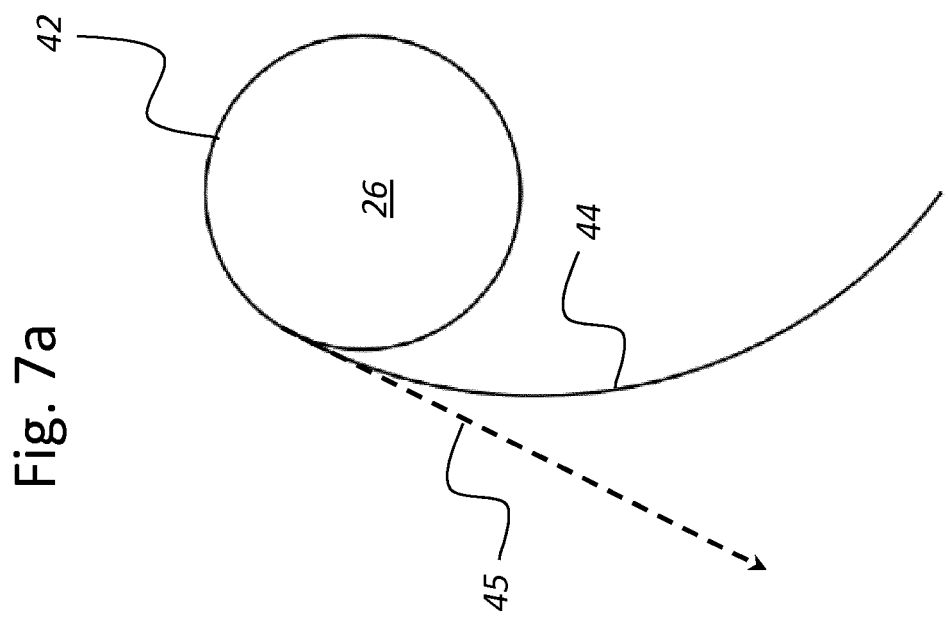

FIG. 7*a* and FIG. 7*b* each show schematic views to illustrate a grain diversion and grain conveying within the distribution unit.

Figure 8:
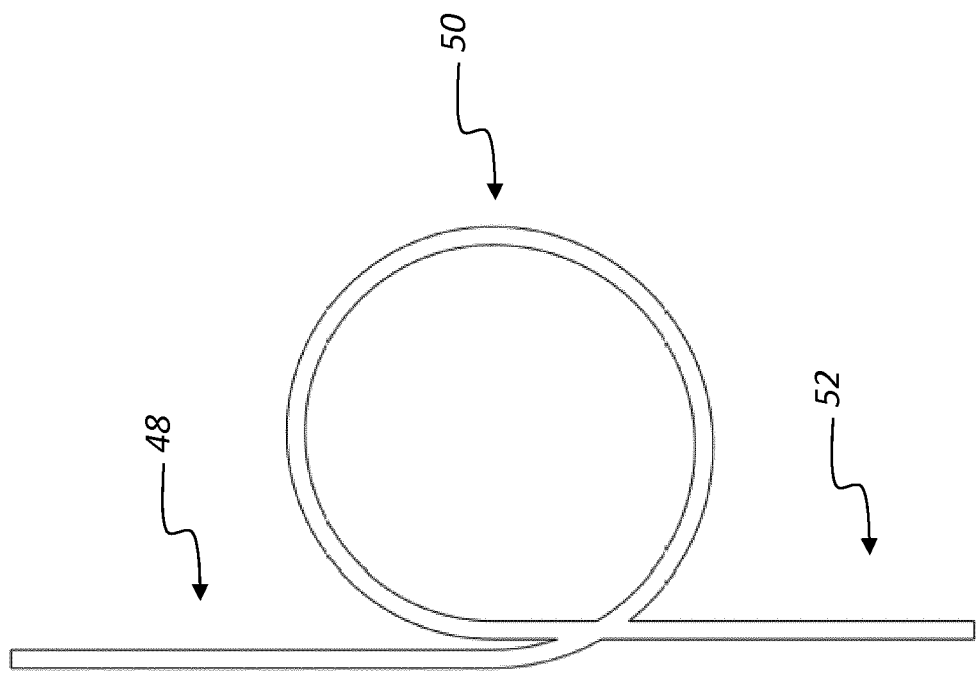

FIG. 8 shows a further variant of grain conveyance.

FIG. 9a to FIG. 9f each show detailed views of a separation disc of the distribution unit and its various effective elements.

Figures 10A, 10B, 11:
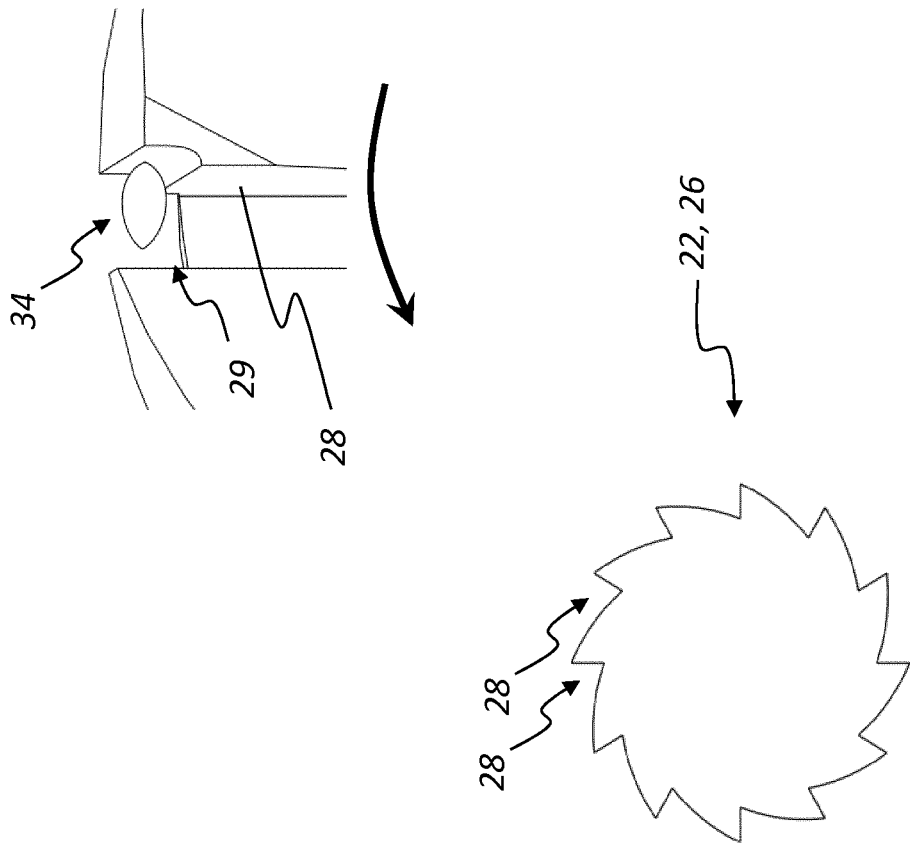

FIG. 10a and FIG. 10b show alternative designs of the separation disc.

FIG. 11 shows a variant of a saw-tooth-like separation disc.

Figure 12:
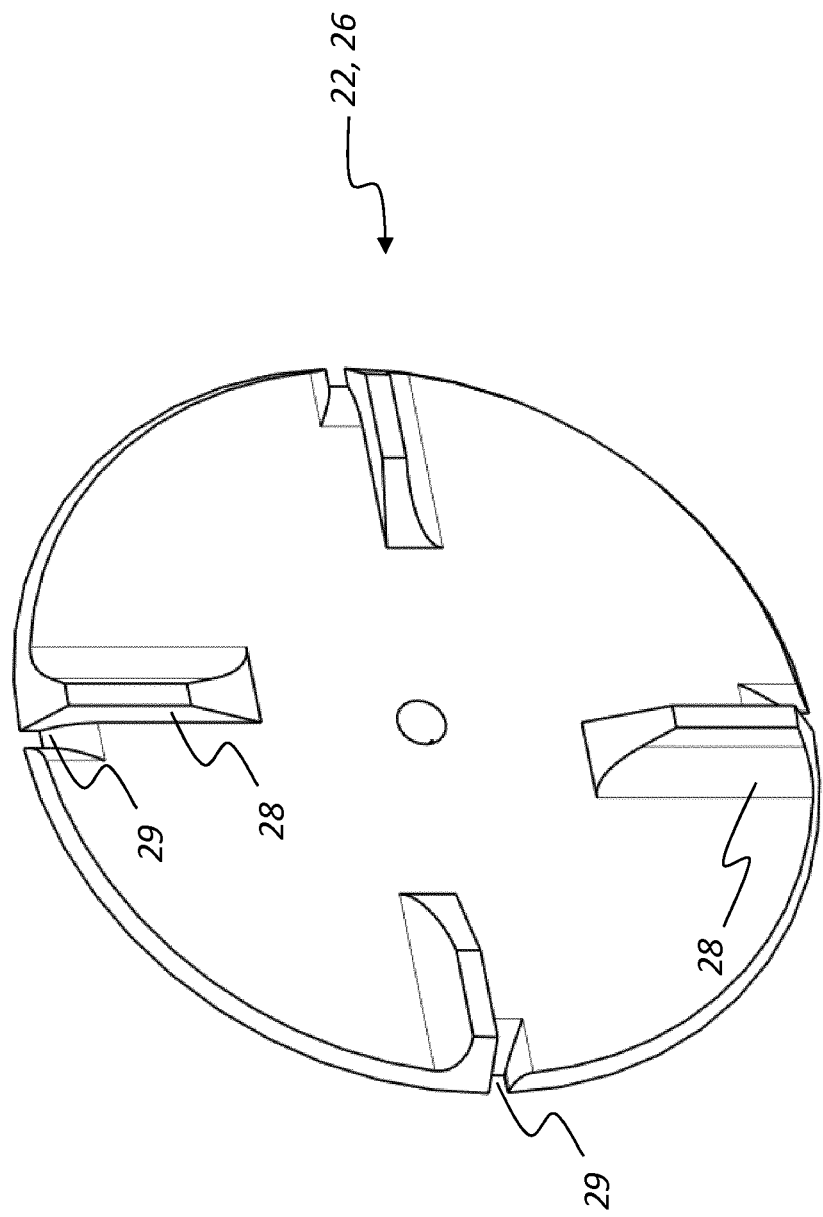

FIG. 12 shows a further embodiment variant of a separation disc.

FIGS. 13a to 13f each show different views of an alternative embodiment of the distribution unit.

FIG. 14 to FIG. 17 show further designs of the separation disc.

FIG. 18 to FIG. 21 show alternative designs of the housing with a modified grain conveyance.

Figure 22:
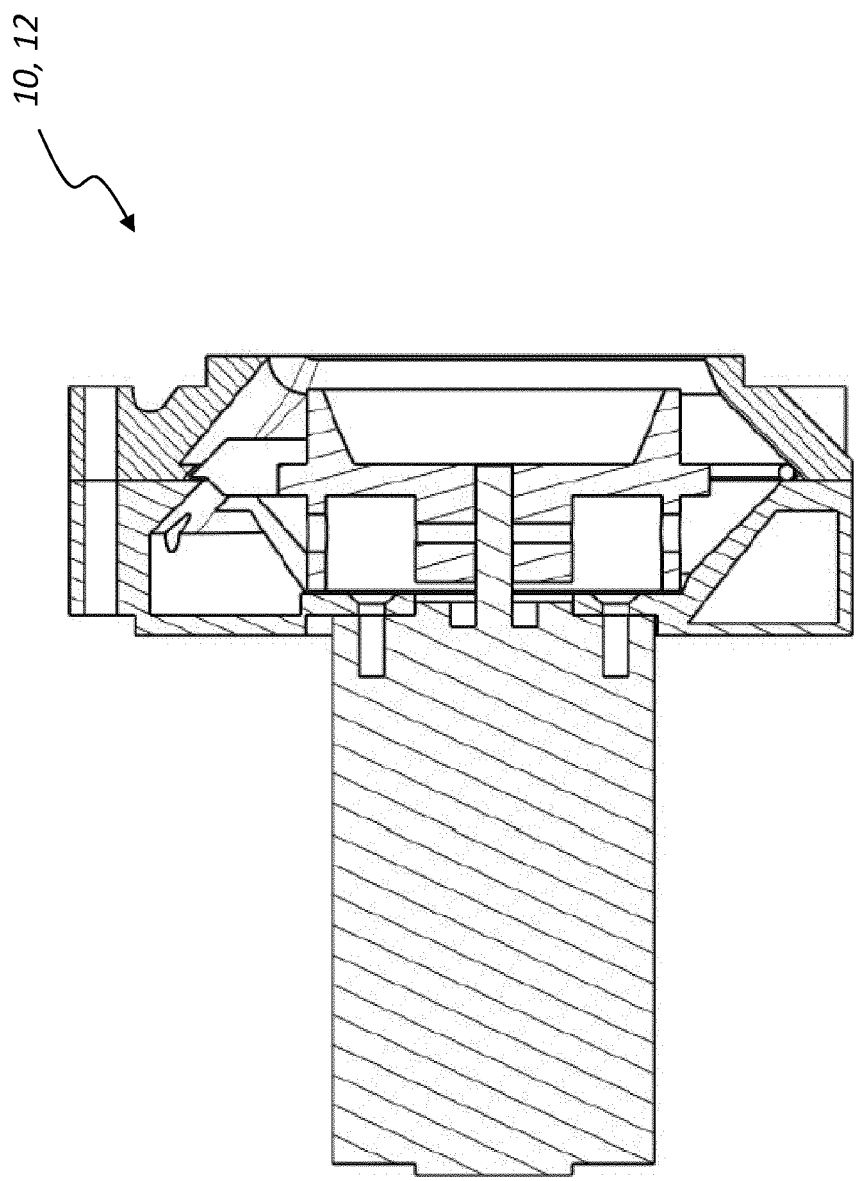

FIG. 22 shows a longitudinal section of the distribution unit.

Figure 23B:
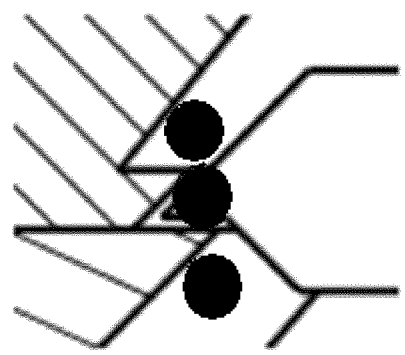
Figure 23A:
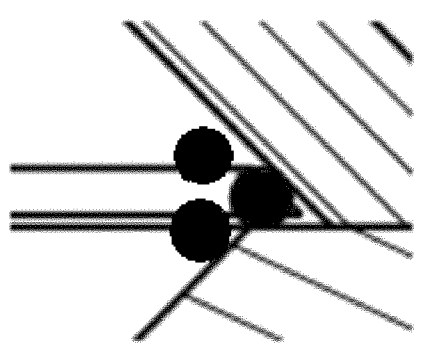

FIG. 23a and FIG. 23b show detailed views of the grain conveyance.

FIG. 24 to FIG. 27, in turn, show a further alternative embodiment of the distribution unit.

Identical reference signs are used for the same or similarly operating elements of the invention. Further, only such references are illustrated in the figures, which are necessary for the description of the respective figure, for the sake of a comprehensive view. The depicted embodiments only present examples as to how the apparatus according to the invention or the method according to the invention can be designed, and do not present an exhaustive limitation.

Figure 1:
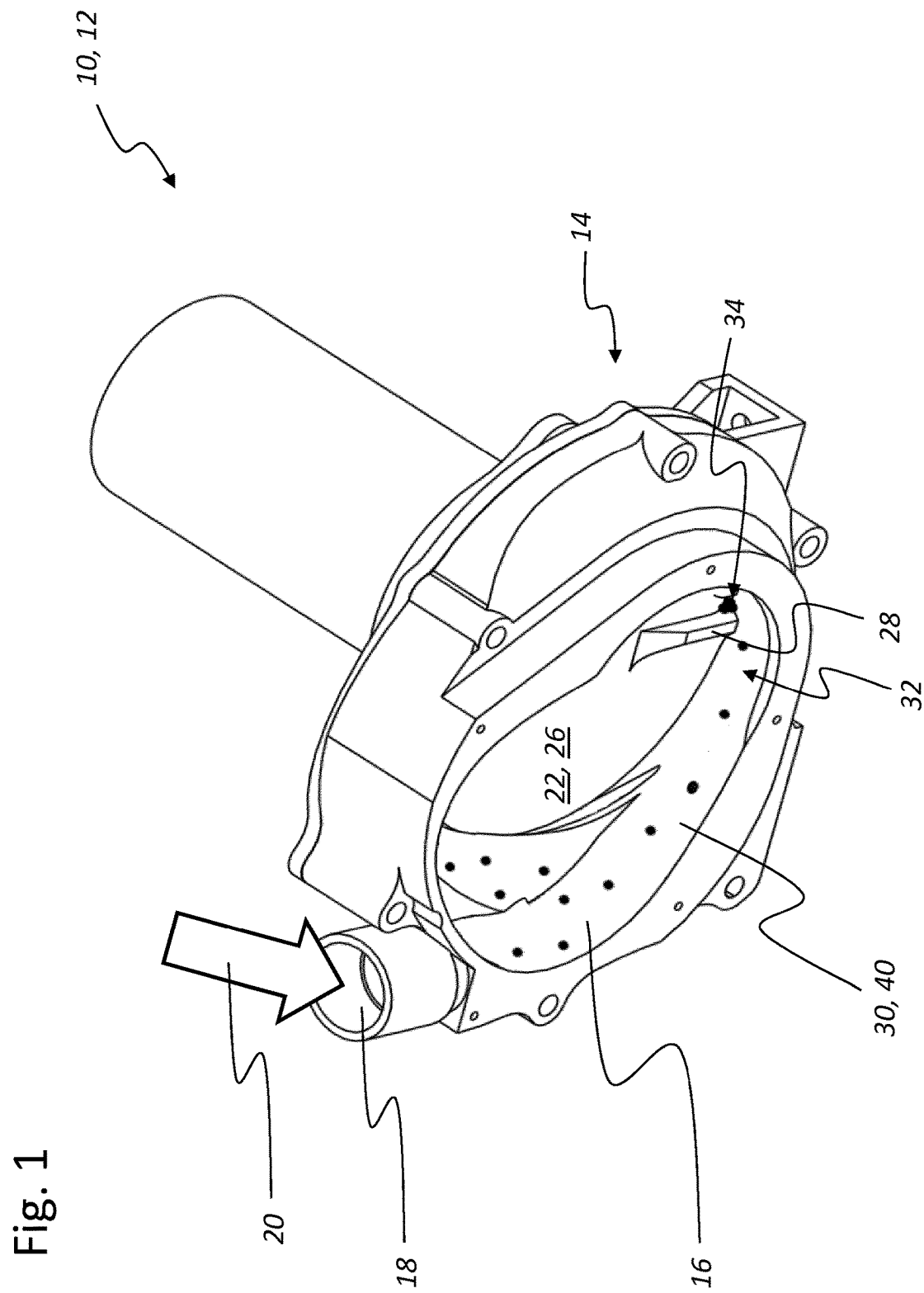
FIG. 1 shows a schematic perspective view of an embodiment of a distribution unit according to the invention.

The schematic perspective view in FIG. 1 clarifies the structure of an exemplary embodiment of a distribution unit 10 according to the invention for granular material such as grains, fertilizer and the like. In the present context, the distribution unit 10 particularly serves as the seeding unit 12 of a distribution or seeding machine and is therefore generally described hereinafter as a seeding unit 12. The distribution unit 10 or seeding unit 12 comprises a housing 14 having an approximately circular and/or circle-segment shaped inner circumferential surface 16 and an inlet opening 18 for an airflow 20 and granular material or seed grains conveyed therein. The unit 10 or 12 further comprises a concentrically rotating conveying device 22 in the housing 14 for the granular material carried in the airflow 20 or the seed grains conveyed therein, as well as an outlet opening 24, which is not clearly discernible in FIG. 1, which connects approximately tangentially to the inner circumferential surface 16 and which discharges the seed grains or the granular material substantially evenly to a seed line, a conveying line or the like. In the depicted exemplary embodiment, the conveying device 22 is formed by a disc 26 rotating in housing 14, which disc can have one, two (cf. FIG. 1) or several (cf. FIG. 2) evenly spaced apart entrainment steps 28 to entrain granular material or seed grains.

Figure 2:
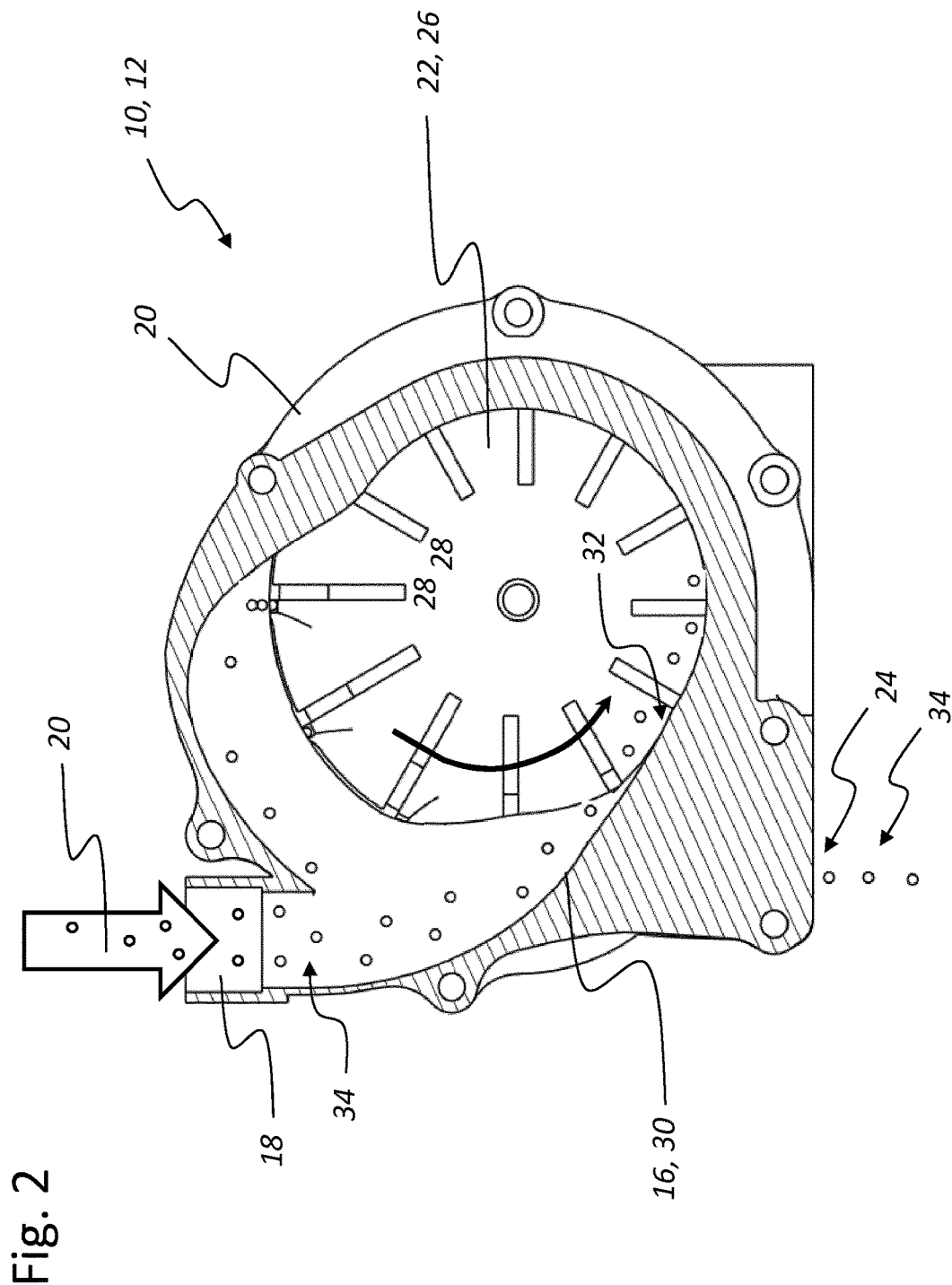
FIG. 2 shows a sectional view of the distribution unit.

As indicated in FIG. 2, the grains carried in the airflow 20 are conveyed through the curved inflow of the inlet opening 18 to the interior of housing 14, in which the rotating disc 26 or conveying device 22 forms a type of metering device for equidistant discharge of the grains in the direction to and from outlet 24. The airflow 20 first facilitates that grains move along the inner circumferential surface 16 and along the curved wall surface 30. Because the inner circumferential surface 16 has an inclined housing surface 32 or an otherwise formed groove-like structure, the dimensions of which, in the further course of movement in the direction of the outlet opening 24, approximately correspond to the size of the separate grains, the grains are urged toward the wall surface 30 along the inclined housing surface 32 and in the direction of the outlet opening 24 towards the seeding disc 26, in the further course of movement where, however, only one single grain 34 finds a space between step 28 and the inclined housing surface 32, as being illustrated in FIGS. 3a and 3b. This is also achieved in that the groove-like structure or inclined housing surface 32 tapers off in the direction of rotation of the conveying device 22 or the disc 26 in the direction of the outlet opening 24. Moreover, because the tapered groove of the inner circumferential surface 16 opens tangentially into the outlet opening 24 in the direction of rotation of the conveying device 22, the separate grains 34 are respectively discharged through the outlet opening 24 in even spacing.

The schematic longitudinal sectional view shown in FIG. 2 perpendicular to the rotational axis of the disc 26 or the conveying device 22 illustrates the direction of rotation of the disc 26 or the conveying device 22, as well as the direction of conveyance of the grains 34, which enter perpendicularly downwards into housing 14 with the airflow 20 through the inlet opening 18, and are conveyed there on the wall surface 30, which is inclined towards the bottom of the inner circumferential surface 16 and in the direction of the inclined housing surface 32, as already illustrated in FIG. 1. The grains 34 are picked up by entrainment devices 28 or the ridges of disc 26 of the conveying device 22 in this phase of the movement, are separated during the course of their conveyance path, and are discharged downwards through the outlet (not shown), which is indicated by means of the grains 34 being discharged at the housing side evenly spaced apart and perpendicularly downwards.

As can be seen in FIGS. 3a and 3b, the grains 34 are urged against the housing wall 30 towards the seeding disc 26. In doing so, the entrainment device or entrainment step 28, which protrudes from the seeding disc 26, pushes the grains 34. A first grain 34a can immerse a little more deeply into the seeding disc 26 based on the geometry of the engaging surfaces, whereas the remaining grains 34b are urged away and settle a little further outwardly (cf. FIG. 3a). The conveyed grain 34a is pushed by the seeding disc 26 or its entrainment step 28 and is in contact with the inner circumferential surface 16 of the surrounding housing 14 at two locations. Because the wall surfaces 16, 30, 32 of the housing 14 rest opposite the rotating disc 16, grain 34a is furthermore constantly moved and caused to rotate in an undefined way, wherein attaching grains 34b break away easier and the conveyed grain 34a is isolated from the remaining grains 34b.

An ejection region 36 begins in the further course of the inclined housing surface 32, in which region the housing contour changes in so far as only a narrow ridge section 38 guides grain 34a (cf. FIG. 3b). Grains 34b, which are located further outwardly, however, fall outwardly through the narrow ridge section 38, based on centrifugal forces and based on the lack of radial guidance. After leaving seeding disc 26, these grains 34b are urged outwardly and re-conveyed via a ramp section 40 (cf. FIG. 1) of the inner circumferential surface 16 in the direction of the inlet opening 18 and into its flow region 20. This axial diversion of grains 34b, which are not discharged through outlet opening 24, is important to create sufficient clearance for outlet opening 24.

The section of the grain conveying region of the housing illustrated in FIG. 3a may be referred to as filling region A in the present context, whereas the section illustrated in FIG. 3b can be referred to as separation region B. In filling region A (FIG. 3a), the entrainment ridges of the separation disc 26 are still inside the filling region. One grain 34a is deeply embedded into the disc 26 and into the groove of the wall surface 30, whereas two further grains 34*b* are also urged into the separation chamber due to its sloped contour. As disc 26 continues to rotate in the direction of the separation region B (FIG. 3*b*), the grains 34 are precisely separated. In doing so, the separated grain 34*a* is further conveyed in the now narrower groove whereas the excess grains 34*b* are re-conveyed back laterally past and beyond the conveying circle via a slope.

The illustration of the longitudinal section in FIG. 3*c* and the detailed illustration in FIG. 3*d* clarify the arrangement of the individual components of a further variant of the unit 10 in their operative engagement, and the conveying of grains 34 at rotating disc 26, which forms the conveying element. The conveyed grain 34 is pushed by the seeding disc 26 or its entrainment steps in this variant, as well, but is in contact with the inner circumferential surface of the surrounding housing, at one location only.

In addition to the variants described in FIGS. 3*a* and 3*b* as well as FIGS. 3*c* and 3*d*, it should be noted that there are other contour shapes in which several grains embed into the disc or can lie in the groove of the housing. With the elongated grain shape of wheat grains, these grains displace each other until only one grain settles. These grains can also be separated by means of the unit according to the invention, even if this is not explicitly shown by means of FIG. 3.

In the detailed illustrations of FIG. 4 and FIG. 5, the course of movement of outlet opening 24 tangentially connecting to the inner circumferential surface 16 is clearly discernible. Its relatively large opening cross section is important to be able to eject undesired foreign matter such as straw portions or the like, which are carried along in the airflow 20. The detailed illustrations of FIGS. 4 and 5 show the arrangement of the outlet opening 24 at the bottom of the housing as well as an alternative embodiment of the disc 26 with only two ridges or entrainment steps 28, which are arranged opposite one another at the outer circumference, respectively.

The schematic illustrations of FIGS. 6*a* and 6*b* clarify the interaction between the rotating seeding disc 26 with the housing wall surfaces 16, 30 and 32. In doing so, grains 34 are first urged towards the housing wall 30 based on the centrifugal forces, which are speed-induced by the airflow 20. Inclined housing wall 30 ensures that the resulting discharge of Fz points in the direction of the seeding disc 26 (cf. FIG. 6*a*). In the ejection region 36, into which excess grains 34*b* are to be pushed away and discharged, the other housing surface 32 is inclined in the opposite direction, wherein the grains are moved away from the seeding disc 26 in the direction of the arrow (cf. FIG. 6*b*).

The schematic illustration of FIG. 7*a* illustrates the further course of grain conveyance. Discharge of the grains 34*a* from a circular path 42 of the separation disc 26 is implemented in a tangential direction into an opened curve 44 with a larger and further opening radius, in the further course of movement, which can finally open into a seed line, a down pipe or the like for discharge of the grains into the soil, which, however, is not illustrated here. The shape of the course of movement of the curve strongly depends on the rotational speed of the disc 26. If the metering device runs relatively slow, this can result in an arch-like, curved course of movement 44, because in doing so, the grains are carried more evenly. If the dosing device runs faster, however, the discharge direction can be almost straight. As outlined by the dotted arrow line 45 in FIG. 7*a*, the discharged grains can have an approximately straight course of movement depending on the discharge speed, particularly because the distance between the separation disc 26 and the coulter can be very short, in some cases, so that the discharge curve 44 can show the approximate straight course of movement 45 according to 7*a*.

The schematic illustration of FIG. 7*b* shows the effect of the entrainment steps 28, which serve as separation aids. In doing so, grains 34 can be readily removed, based on a depression 46 in housing 14 during rotation of the separation disc 26. Possibly occurring double occupations are more easily resolved thereby so that only one separate grain 34*a* is being discharged, throughout.

The outlined conveying course of movement in FIG. 8 illustrates three phases of grain conveyance, altogether. In the first phase 48, the grains are carried by the air. In the second phase 50, the grains are pushed mechanically, whereas in the third phase 52, they are carried out by air, again. The third phase 52 is drawn straight-lined in FIG. 8 but can also have the curved course of movement 4, as shown in FIG. 7. Whereas only the airflow takes care of grain conveyance in phases 48 and 52, with very low prevailing friction, grain conveyance is governed and dominated by a high friction rate in the second phase due to the mechanical portion, with high prevailing friction. In doing so, it is achieved that grains 34 find their way from an airflow dominated transport in the first phase 48 into a mechanically dominated and mechanically pushed transport in the second phase 50 within housing 14, and from there, in turn, into the airflow dominated transport in the third phase 52, although almost the same volumetric flow of air prevails in all three zones 48, 50 and 52. It is crucial for this function that the grains are, urged by means of centrifugal forces Fz, radially outwardly to the housing wall (cf. FIG. 3). This causes a strong deceleration of the grains based on the increased friction towards the wall, wherein additional deceleration is achieved by means of a slight jamming of the grains into the inclined housing surface 32. The rotating element—disc 26—can therefore push and sort the grains, although partially high air speeds prevail around the disc 26. Admittedly, the transport airflow is always present and passes through the inlet opening 18 and outlet opening 24 of the housing 14; the transport in the second phase 50, however, is temporarily transferred to the mechanically rotating element—the conveying device 22 or the seeding disc 26. The discharge of the grains through the outlet opening 24 into the down pipe or seed line can thus be implemented very evenly, because the grains have not left the actual transport airflow but are merely supported mechanically.

Because the grains are already enclosed by a strong airflow while they are still at the separation disc 26, they can be transferred into the down pipe very evenly. Prior to and after discharge, the flow direction of the air and grain flow 20 is identical. Although there is transport air in the metering system no grains are swirled around. Rather, the grains are pushed by centrifugal forces Fz towards the inner circumferential surface 16 of the housing 14 so that grain separation can be achieved at the housing wall.

The perspective view in FIG. 9*a* and the detailed illustration in FIG. 9*b* show one alternative embodiment of disc 26 and the entrainment steps 28 fitted thereon, which are combined here with recesses or perpendicular grooves 29 and are arranged immediately at a step 28 adjacent to the outer circumference of the disc 26 and are thus dimensioned in such way that one grain 34, respectively, can be accommodated in grooves 29 (cf. FIG. 9*b*), whereas further grains 34 are conveyed by entrainment steps 28 but during the further course of conveyance by conveying device 22 are urged back into the collective inventory of the housing. As also illustrated by FIGS. 9c and 9d, this method of grain separation is supported by the centrifugal forces of the fast rotating conveying device 22, which forces—in operative engagement with the design of the inner circumferential surface of the housing—ensure that only the separate grain 34 located in the groove 29 is further conveyed towards the outlet.

Figure 9E:
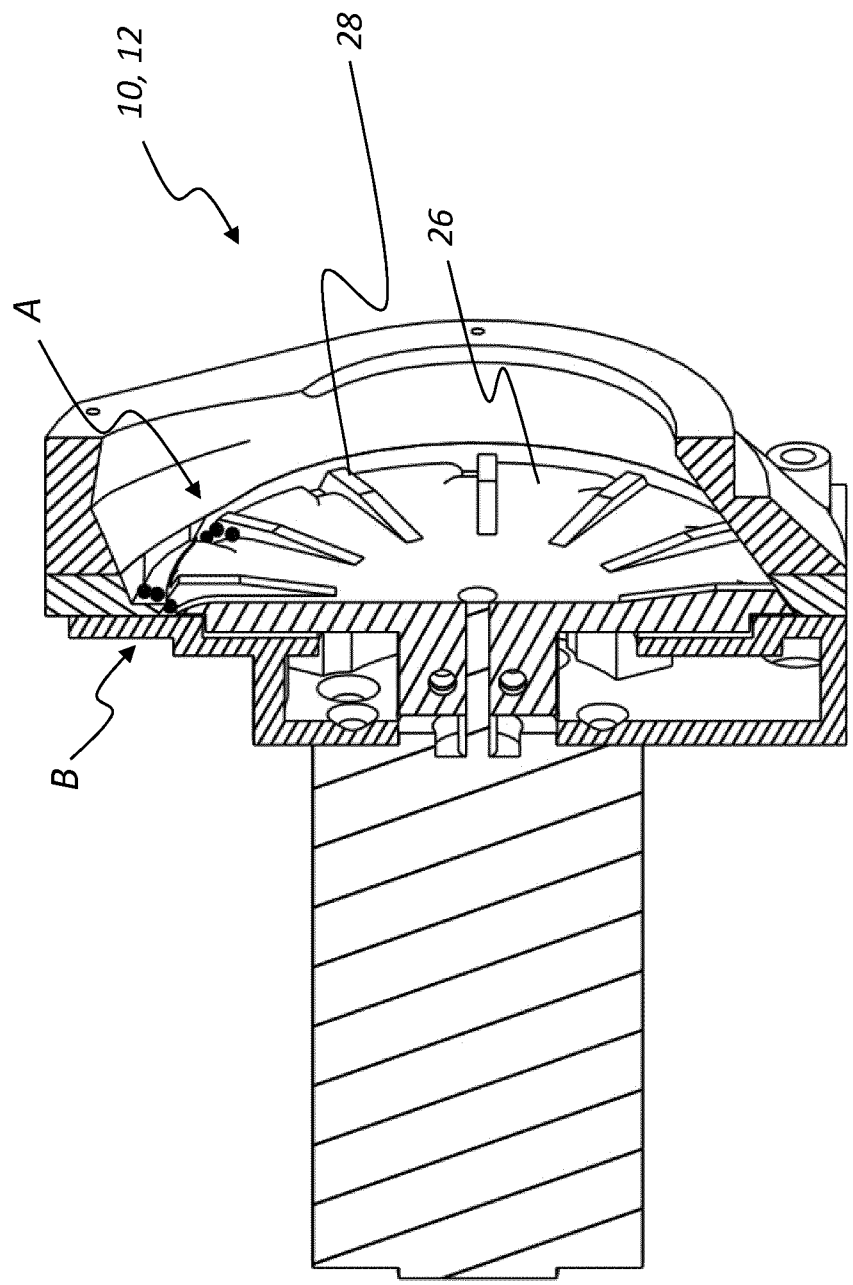
Figure 9F:
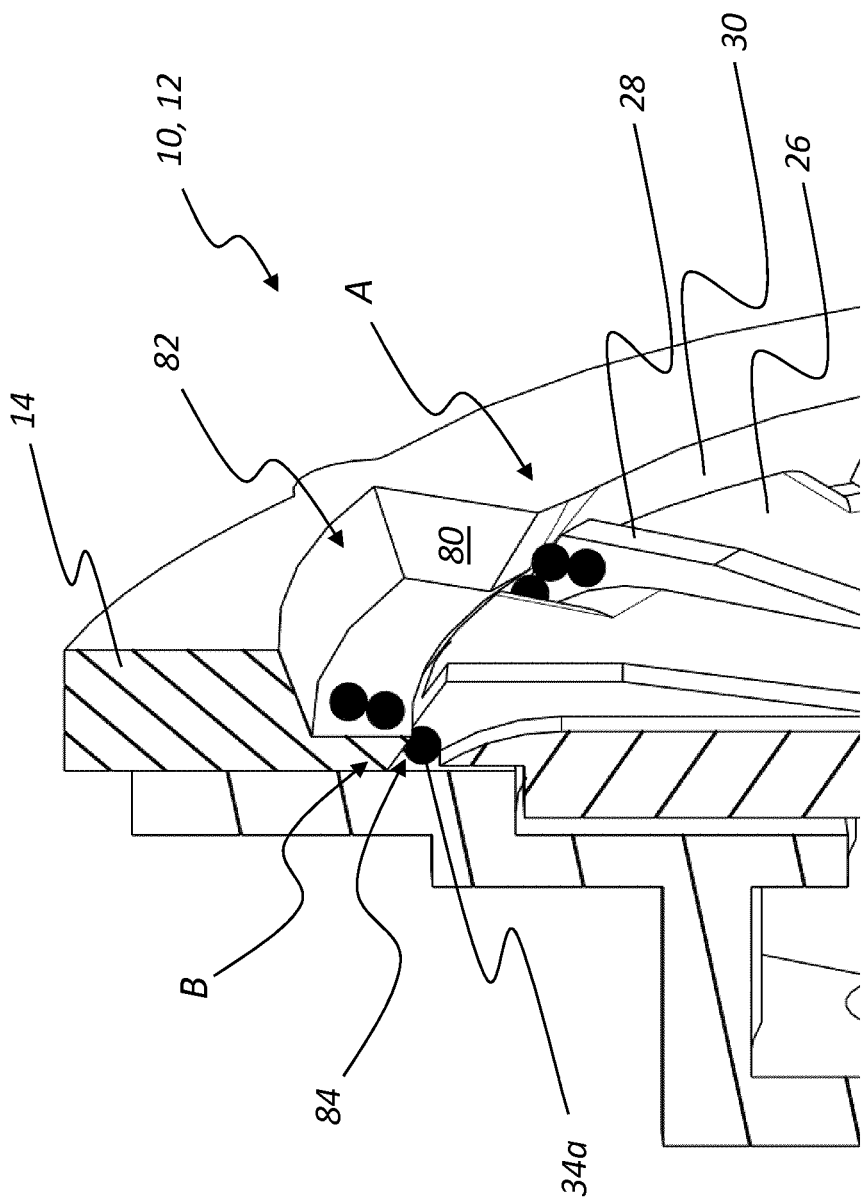

The longitudinal section view in FIG. 9e and the enlarged view thereof in FIG. 9f illustrate, again, the transition from the grain guiding portion of the filling region A, which reaches very far to the top, almost to the upper zenith of the circular grain movement, into the separation region B, wherein excess grains are pushed upwardly and outwardly from the rotating disc 26 so that each of the entrainment steps 28 only conveys exactly one grain into the direction of the outlet opening. The detailed view in FIG. 9f depicts this region of the housing 14, again, in more detail. The wall surface 30 of the housing 14 has a distinct step 80 in the passage from regions A to B so that the wall surface 30 extends outwardly in the direction of a larger diameter past the step 80 and forms a grain discharge space 82, into which grains 34—still being conveyed by the entrainment step 28 along the wall surface 30—can glide. Only the one grain 34a to be separated remains at the entrainment step 28 of the rotating disc 26 and is being further conveyed thereby; now, however, grain 34a is positioned below the grain discharge space 82 in a portion of the housing having a smaller radius, where grain 34a is further separately conveyed in a triangular grain guiding groove or grain guiding edge 84 (cf. also FIG. 3b), until it is discharged in a mostly circular course of further movement or in the further course of movement of the curve 44 (cf. FIG. 7a) in the direction towards the outlet opening.

This distinct grain guiding edge 84 in the housing can be found in FIG. 7b, generally indicated as groove 46. The grain guiding edge 84 or groove in the grain conveying inner circumferential surface of the housing in the separation region B is indispensable for the separation effect of the distribution unit 10 because otherwise an undefined amount of grains would be pushed by the entrainment step 28 through the housing in the direction towards the outlet, wherein the desired function and mode of operation of the device would be significantly impaired if not destroyed.

FIGS. 10a and 10b show alternative disc designs, where the entrainment steps 28 are significantly smaller compared to the previously illustrated variants. The size and contour of the grooves 29, which adjoin the entrainment ridges 28, respectively, are aligned with the respective grain shape and grain size to be handled. The schematic illustration in FIG. 11, however, shows a saw-blade-like contour of the disc 26, the outer circumference of which is provided with a plurality of entrainment ridges 28, each having the contour of saw-teeth.

The contour of the ridges or steps 28 and grooves 29 of the alternative embodiment of the separation disc 26 shown in FIG. 12, is similar to the variant previously shown in FIG. 9. The disc according to FIG. 12, however, has four entrainment steps 28 and grooves 29 adjacent thereto, which each are offset to one another by 90°.

The further illustrations of FIG. 13 (FIG. 13a, FIG. 13b, FIG. 13c, FIG. 13d and FIG. 13e) all show alternative embodiment of a housing design and a separation disc 26, which are suitable for separation and seeding of rapeseed. The schematic illustration in FIG. 13a and the enlarged portion in FIG. 13b illustrate the successive regions, into which the grains are first picked up by the entrainment steps 28 of rotating disc 26. In doing so, the entire filling region A is positioned upstream of the grain discharge space 82, which gradually opens outwardly into the separation region B, where the grains, which are not conveyed separately in the grain guiding groove 84—which is tightly positioned at the outer circumference of disc 26—are discharged outwardly and are conveyed in the direction towards a re-conveying region C by means of their rotating movement. These grains, which pass re-conveying region C, are conveyed again, or repeatedly, if required, to filling region A within the housing by means of the airflow prevailing therein and can be picked up and rotated, again, by the disc 26. The flat, grain discharge space 82 transitions into a rounded ramp 86 in the re-conveying region C, which opens into the inner housing space and forces the grains into a movement, which diverts them away from outlet opening 24 and re-conveys them to the filling region in the housing (cf. FIG. 13e). The ramp 86 thus forms a type of re-conveying slope 88 (cf. FIG. 13e) for excess grains, by means of which these grains are re-conveyed to the housing and to filling region A.

Figure 13A:
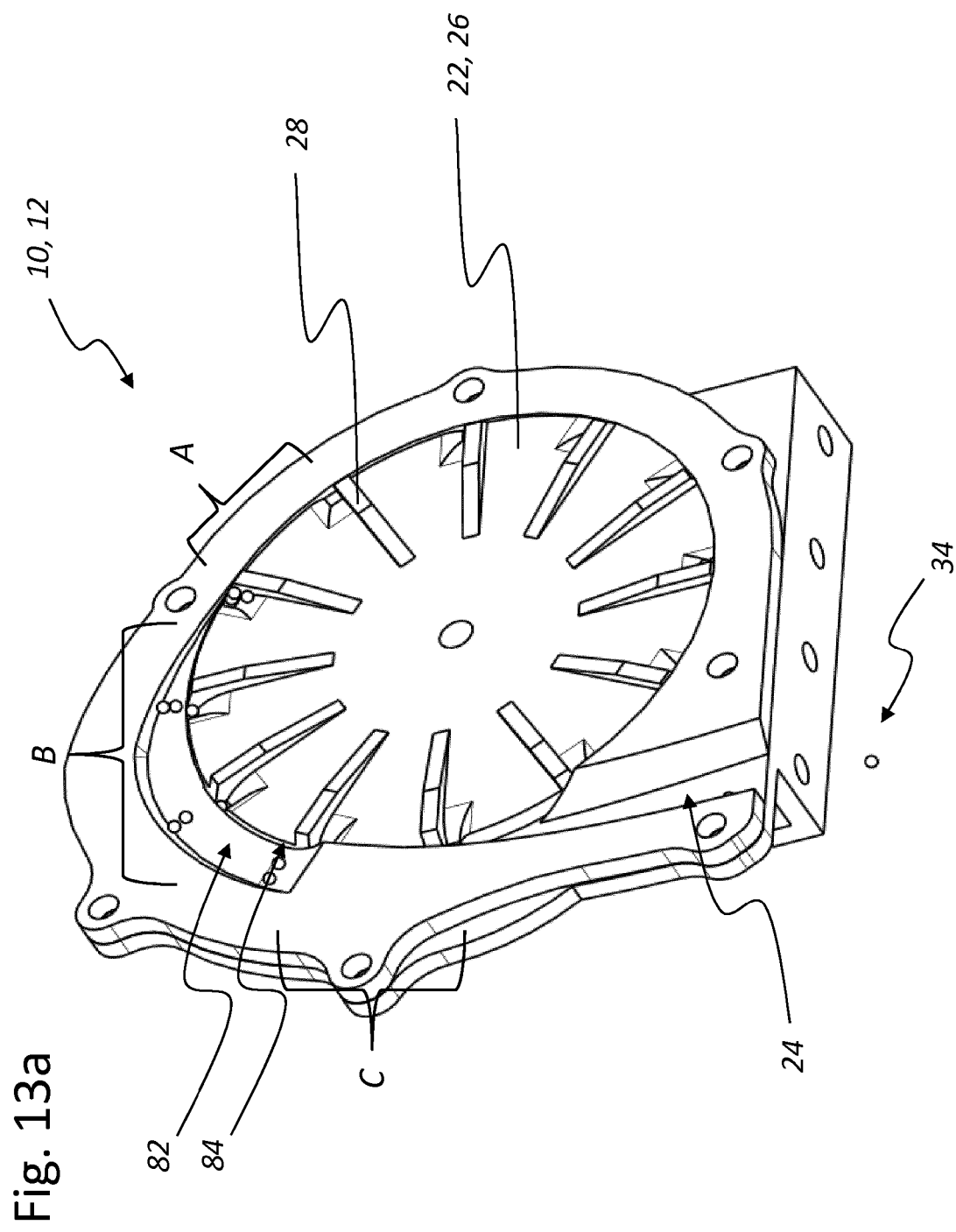
Figure 13B:
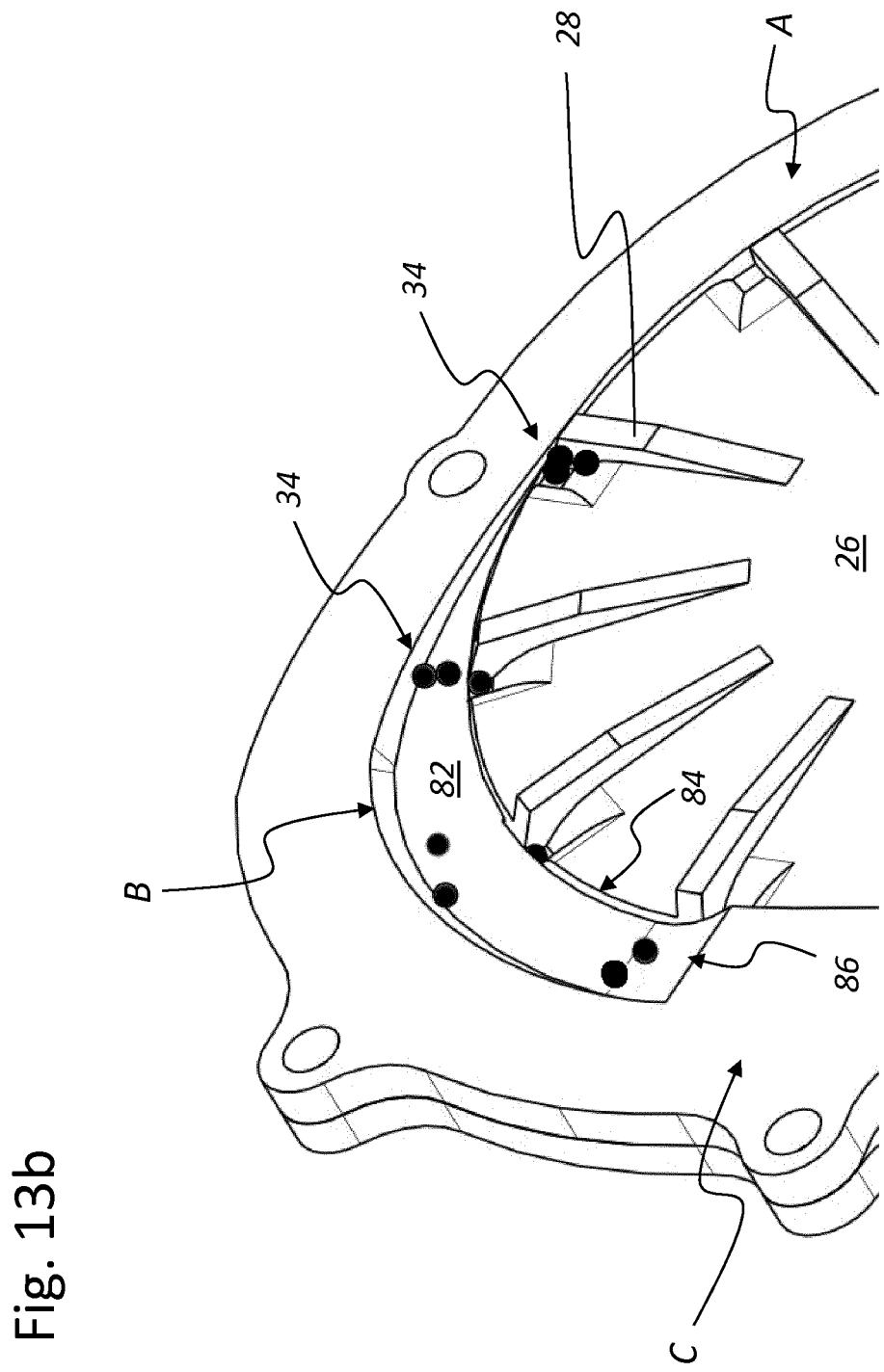

The illustrations in FIGS. 13a and 13b therefore clearly illustrate the separation course of seed commodity. In the filling region A, the grains are picked up by the entrainment devices 28, wherein a separate grain is deeply immersed into the disc and two further grains are also compacted towards the separation chamber or grain conveying edge 84, based on the sloped contour. In the separation region B, the separated grain is conveyed to the narrower groove 84 or gouge 84, whereas the excess grains are re-conveyed laterally past and beyond the conveying circle via the ramp 86 and slope 88 (FIG. 13e).

Figure 13C:
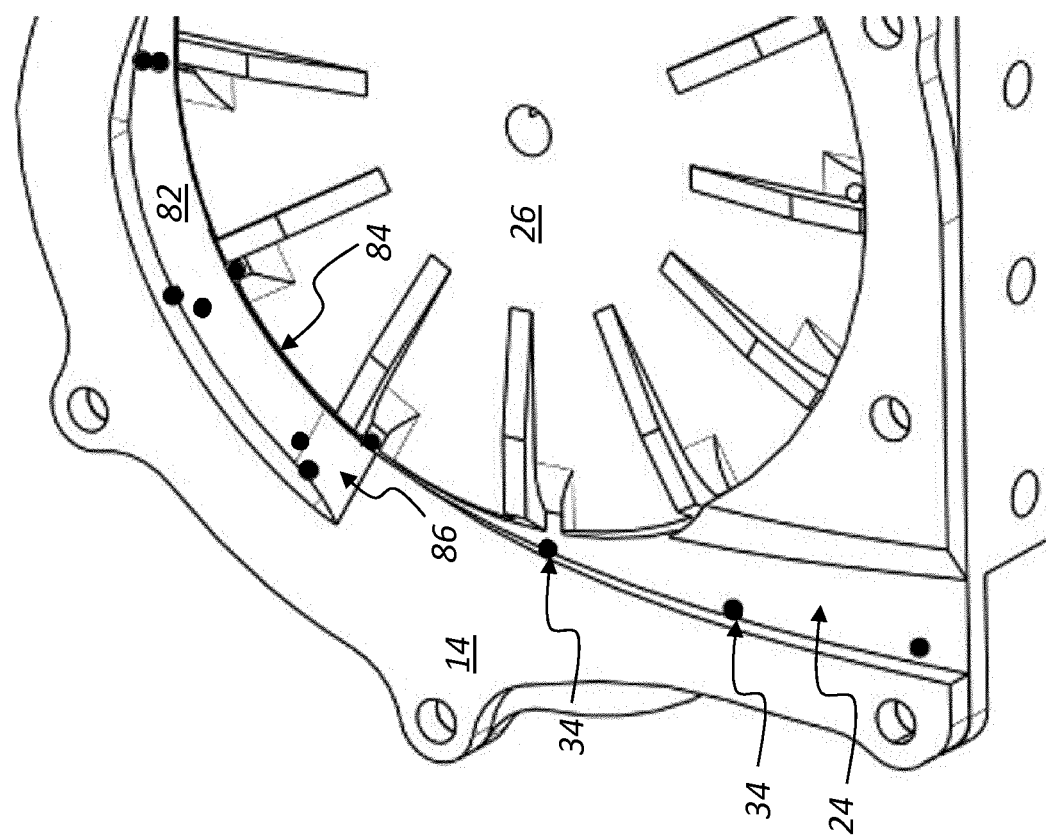

The schematic illustration of FIG. 13c clearly illustrates how the grains located outside of the grain guiding groove 84, and being conveyed into the separation region B in grain discharge space 82, are conveyed via the ramp 86 in a direction angled towards the surface of the disc 26 and therefore diverted from the precisely separated grains, which are discharged downwardly through the outlet opening 24 from the housing 14. These grains conveyed via the ramp 86 end up in filling region A, again, and do this repeatedly, if necessary.

Figure 13D:
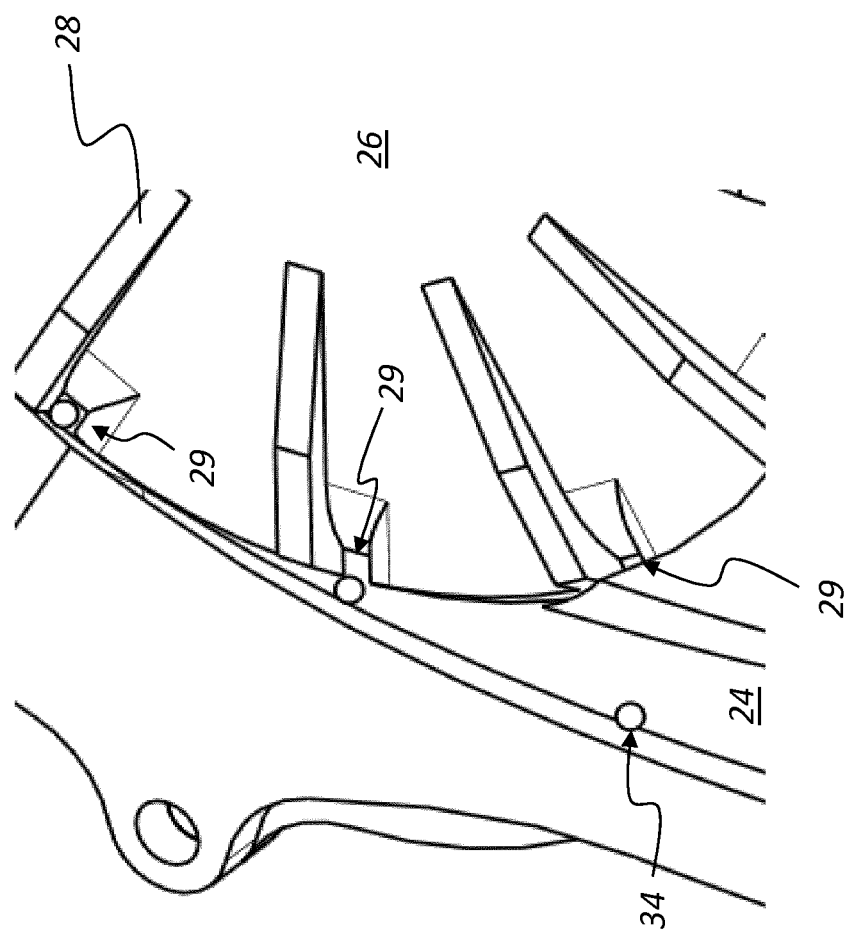

The detailed view in FIG. 13d depicts the design already shown in FIGS. 9a to 9d of separation disc 26, having the rectangular shaped grooves 29 in the direction of conveying, upstream of the entrainment steps 28, and associated recesses, so that the separated grains are conveyed therein and allows a diverging design of the separation region B and the grain discharge space 82, which can be designed with the distinct step 80 according to FIG. 9f, for example.

Figure 13E:
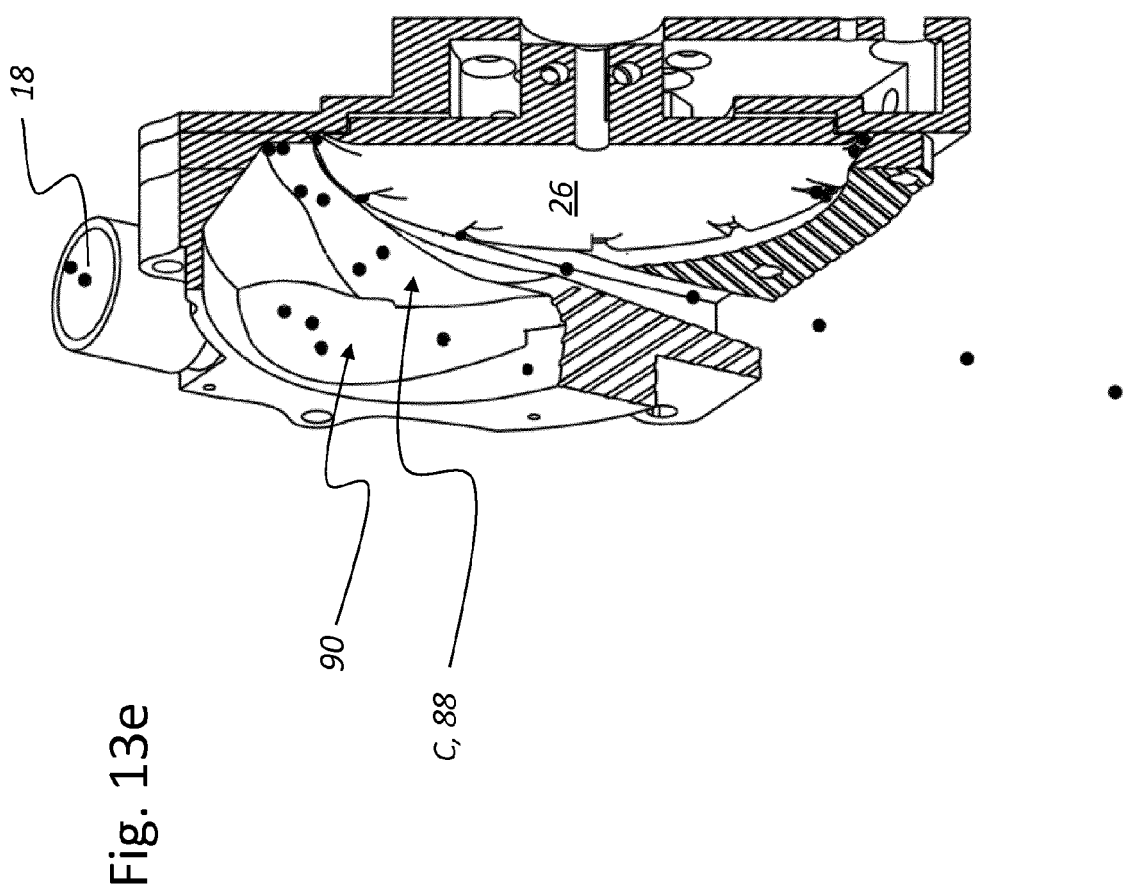
Figure 13F:
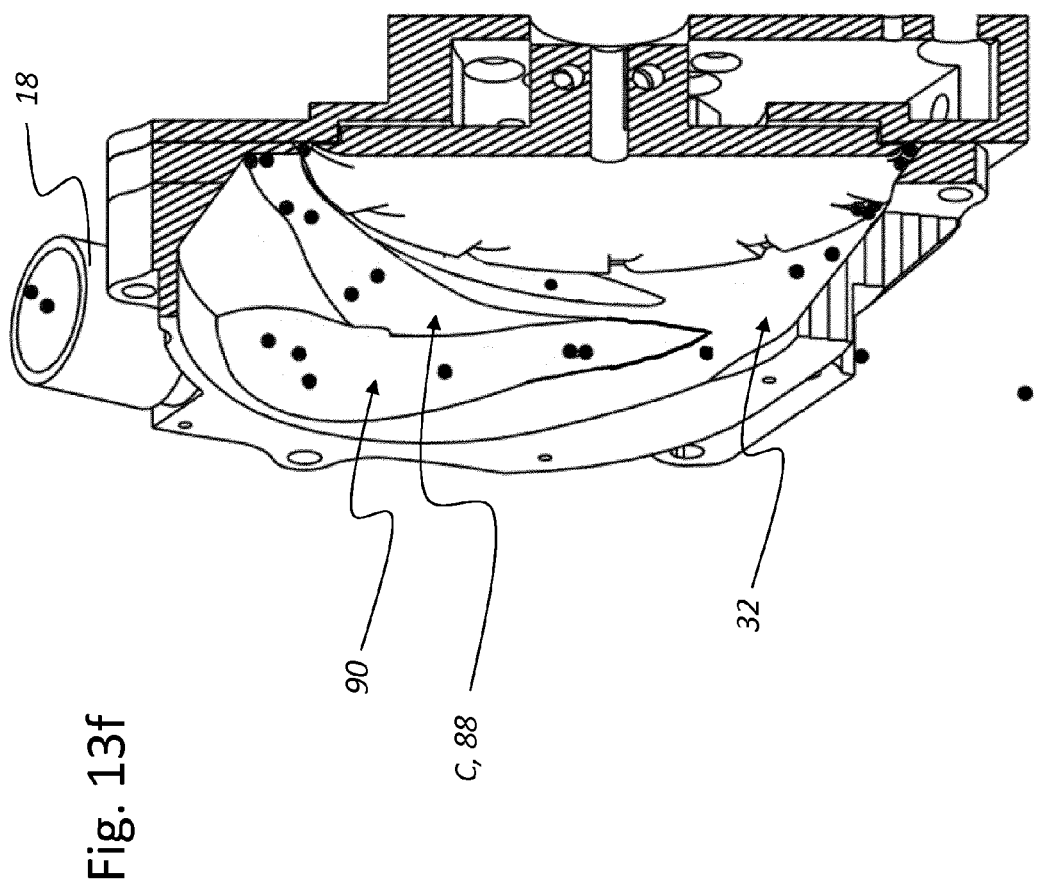

The sectional views of FIG. 13e and FIG. 13f show more clearly the continuation of the re-conveying region C, which cannot be discerned in FIGS. 13a to 13d, which opens without steps—i.e. in a rounded contour—into a wider slope 88 from the ramp 86, which cannot be discerned here, which slope subsequently intersects with another slope 90, which extends approximately vertically from the upper inlet opening 18 and through which grains are conveyed through the inlet opening 18 back towards the inner housing. FIG. 13e clarifies the conjunction of excess grains, which are re-conveyed, with grains newly entering through the inlet opening. The grains are separated into two groups in separation region B, that is separated grains, which are discharged downwardly, and execs grains, which remain in the housing. In doing so, the excess grains are conveyed past discharge 24 of the separated grains via a slope (re-conveying region C). New grains, flowing from the seeding machine, reach the housing via the inlet opening 18 and meet the excess grains from region C in the housing region 16. The newly conveyed and excess grains are conveyed past the outlet opening 24 via the slope 88 and further slope 16 or 90. Subsequently, these grains are again urged towards the separation disc 26 based on the inclined contour 32 of the housing surface.

FIG. 13f, again, clarifies that the grains move axially and radially away from the disc 26 and then, again, towards it. The course of movement of the grains is therefore as follows: excess grains are conveyed axially and radially away from the separation disc 26; subsequently, these grains are conveyed past the outlet channel 24 for discharge of separated grains and, in doing so, are radially re-conveyed to the separation disc 26; finally, the grains are again axially guided towards the separation disc 26.

Figure 14:
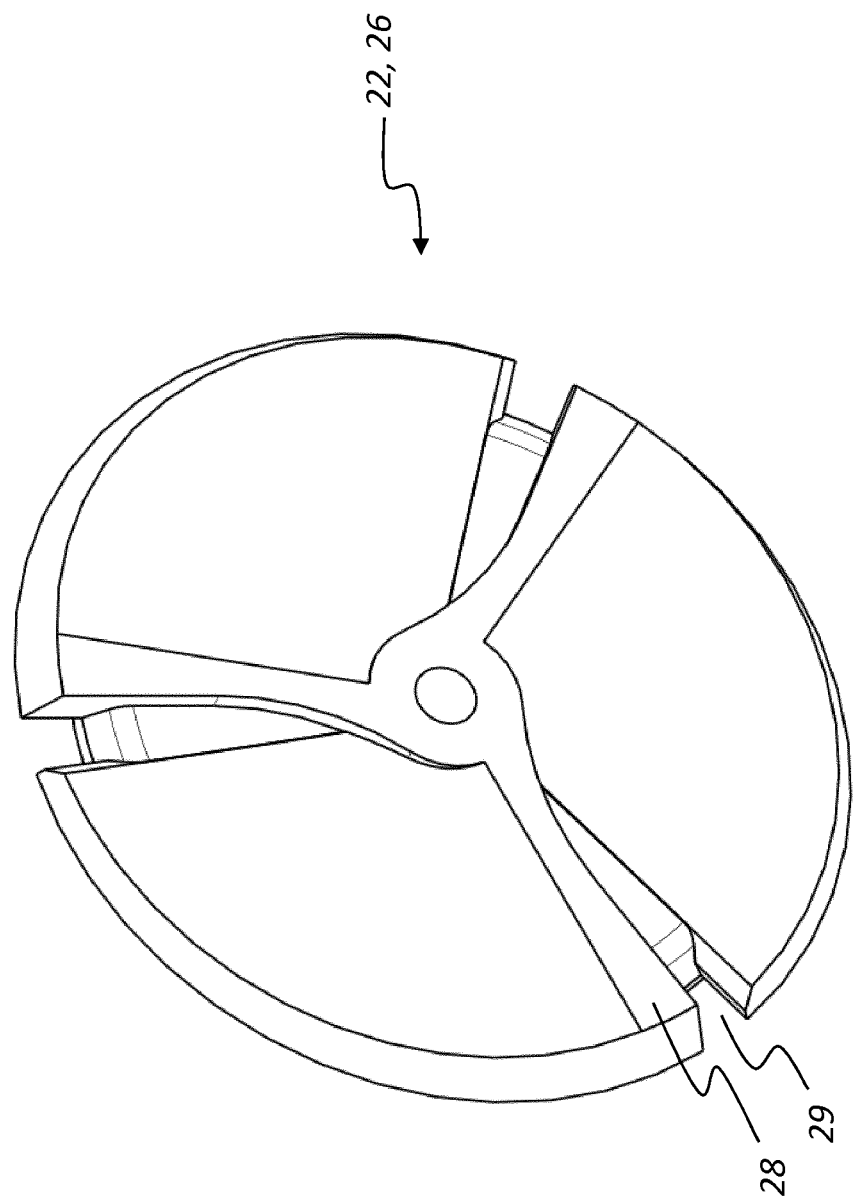

The variant of the separation disc 26 according to FIG. 14, which is particularly suitable for the separation of peas, has three entrainment steps 28, which are offset towards one another by 120°, respectively, and corresponding grooves 29, wherein the steps 28 are designed to be relatively flat; the grooves 29, however, are designed to be relatively large.

Figure 15:
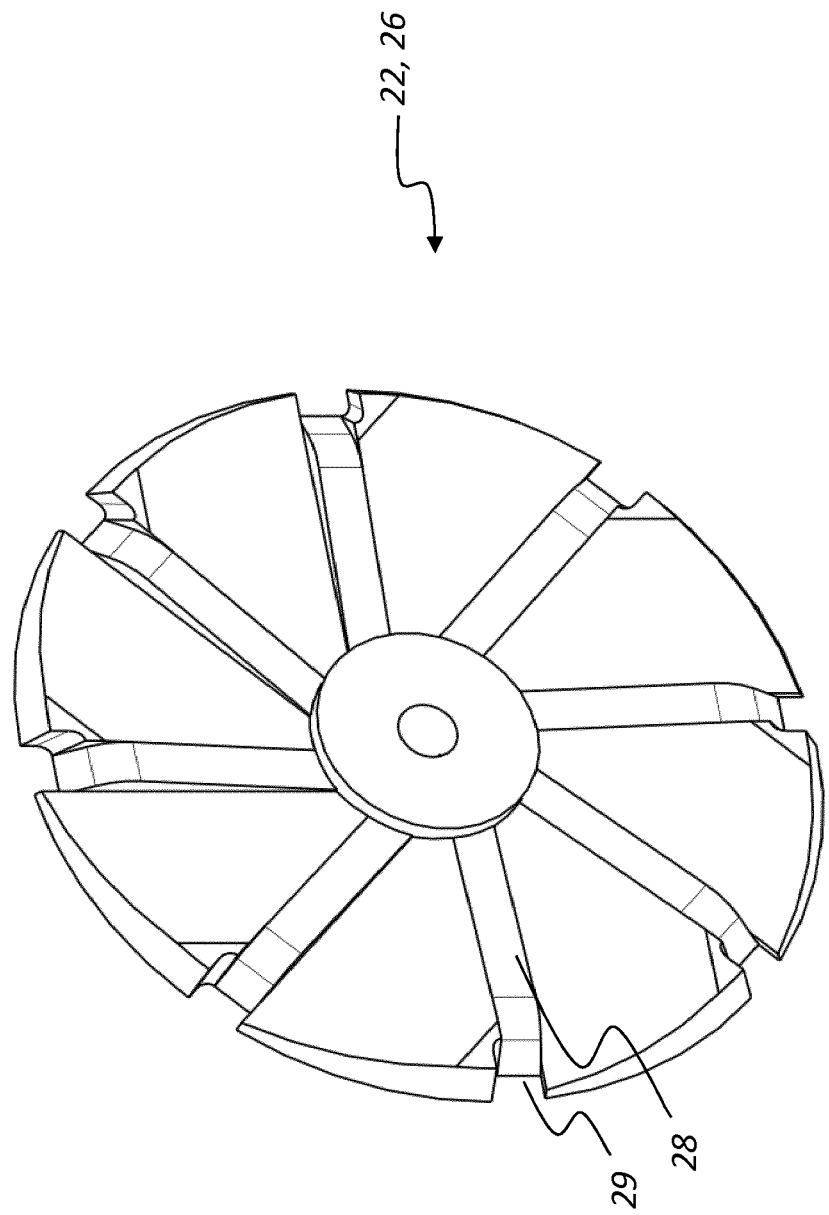

The variant of the separation disc 26 according to FIG. 15, which is particularly suitable for the separation of wheat seeds, has a total of eight entrainment steps 28, which are evenly distributed over the front disc surface, and the corresponding grooves 29, wherein, again, the steps 28 are designed to be relatively flat; the grooves 29, however, are designed to be relatively large.

Figure 16:
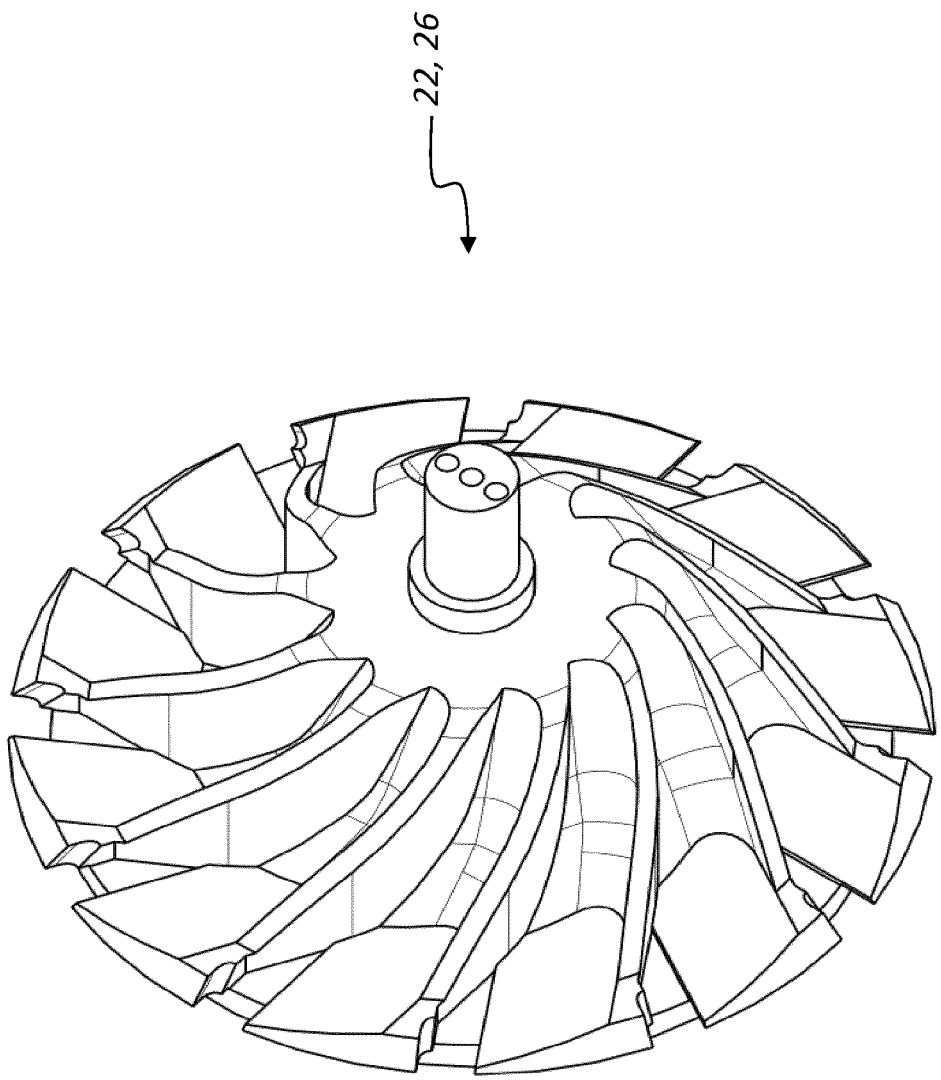
Figure 17:
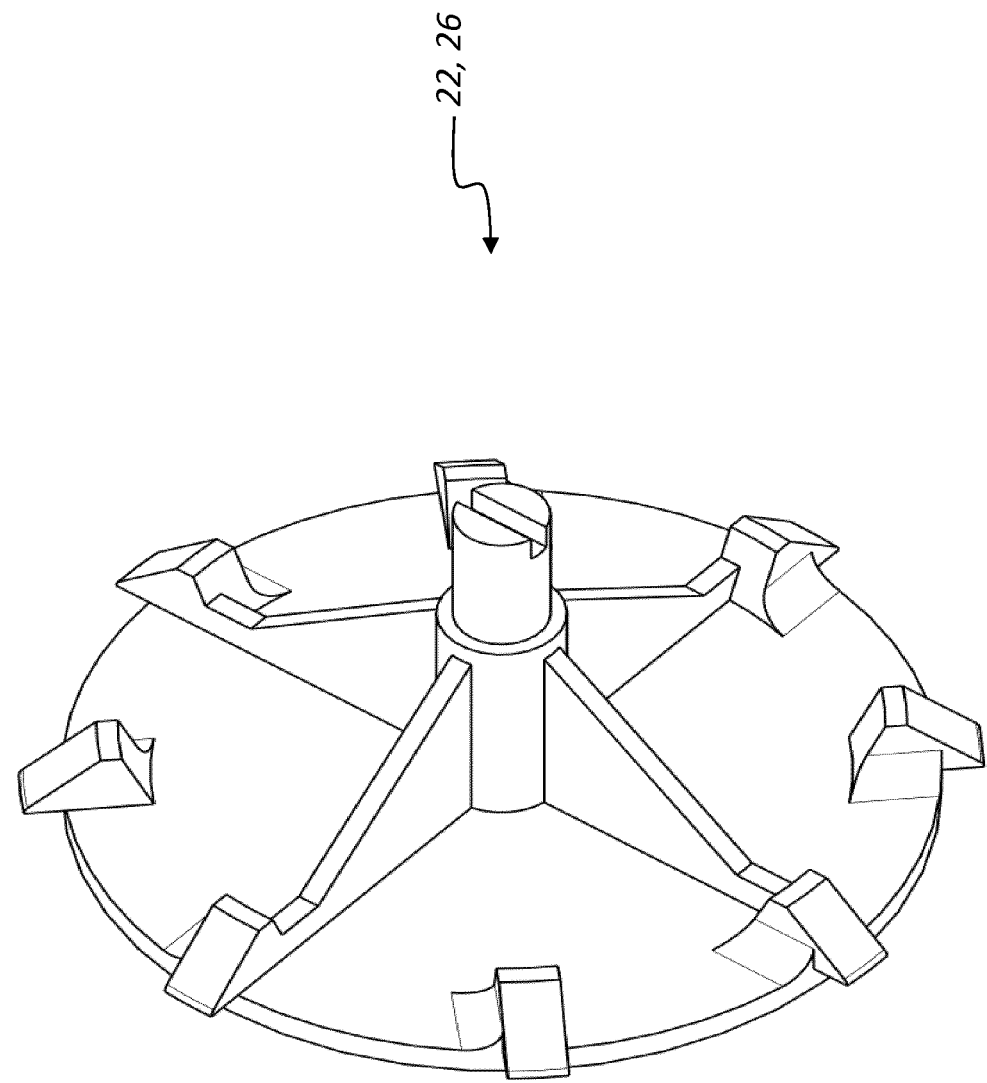

The disc variants shown in FIG. 13 are particularly suitable for the separation of rapeseed grains, whereas the variant shown in FIG. 14 is particularly suitable for the separation of peas. The variants shown in FIGS. 15, 16 and 17 are particularly suitable for the separation of wheat grains. As can be discerned from the perspective views in FIG. 13, a plurality of ridges 28 and grooves 29 is arranged at the disc front surface of the discs 26, which are particularly provided for the separation of rapeseeds, which plurality facilitates a relative slow rotation of the disc 26 but still a sufficient conveyance capacity.

Figure 18:
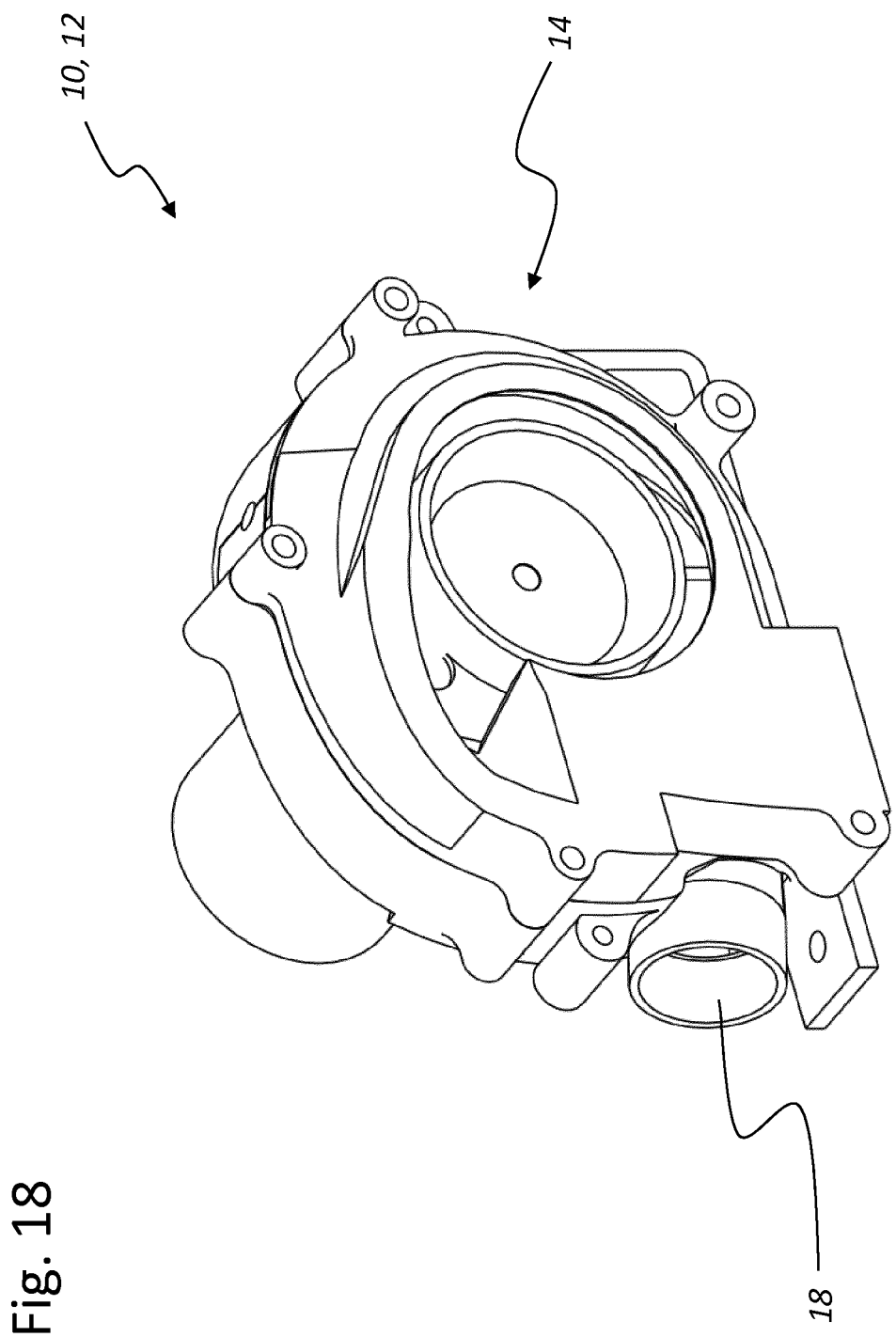
Figure 19:
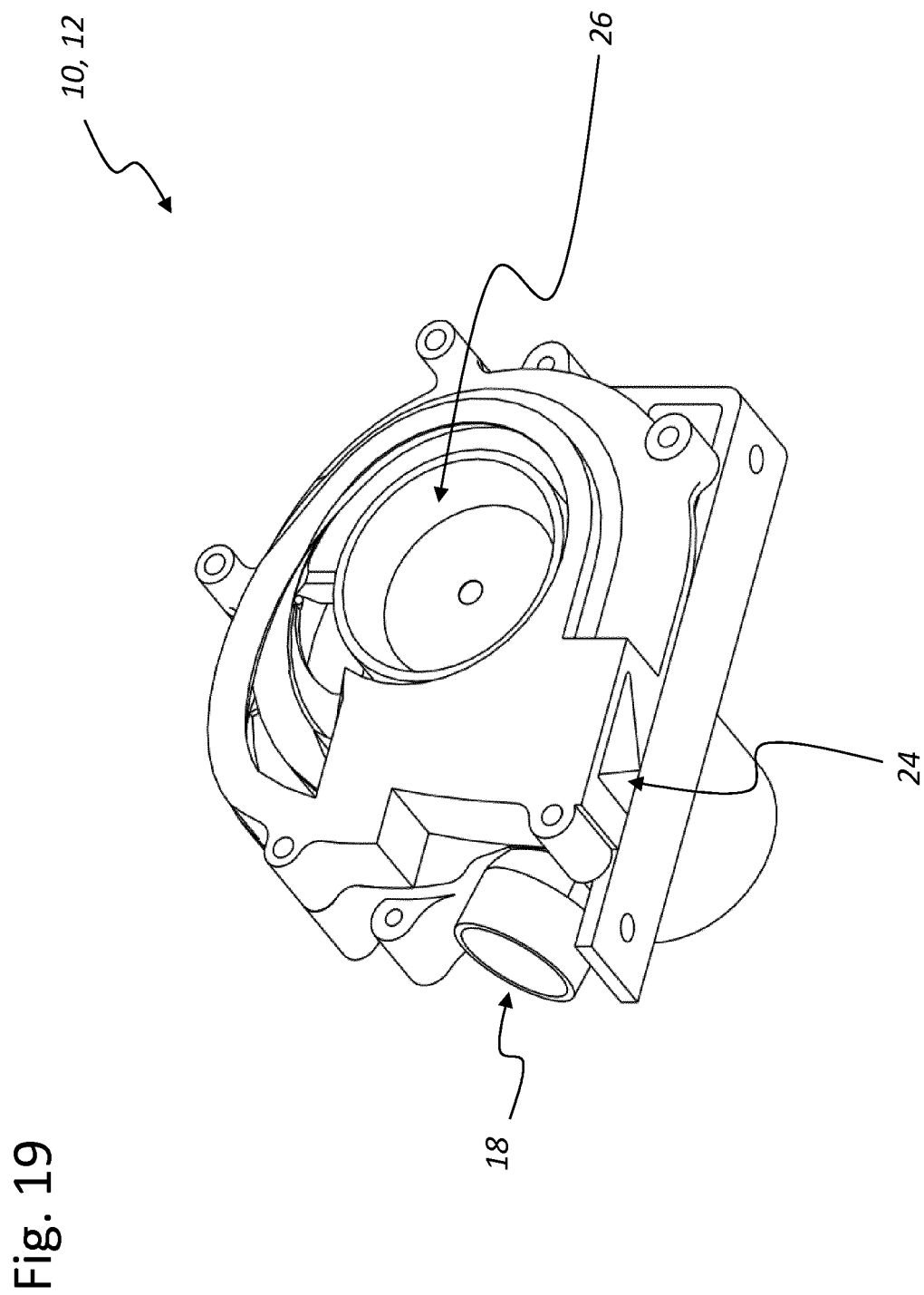

The schematic perspective views of FIGS. 18 and 19 each show a further variant of the metering system or distribution unit 10 according to the invention with a horizontal inlet opening 18, which opens in to the inner circumferential surface 16 of the housing 14, as in the previously shown variants. As can be seen in FIG. 18, the inlet opening 18 is located at a deep-set location of the housing 14, which can impart a rotational movement to the grains before or during entering the housing 14. In doing so, it can be ensured that the grains remain at the wall and are guided toward and reach the separation disc 26 as far outwardly as possible. The outlet opening 24 arranged at the bottom side of the housing 14 opens perpendicularly downward, as can be discerned in FIG. 19.

Figure 20:
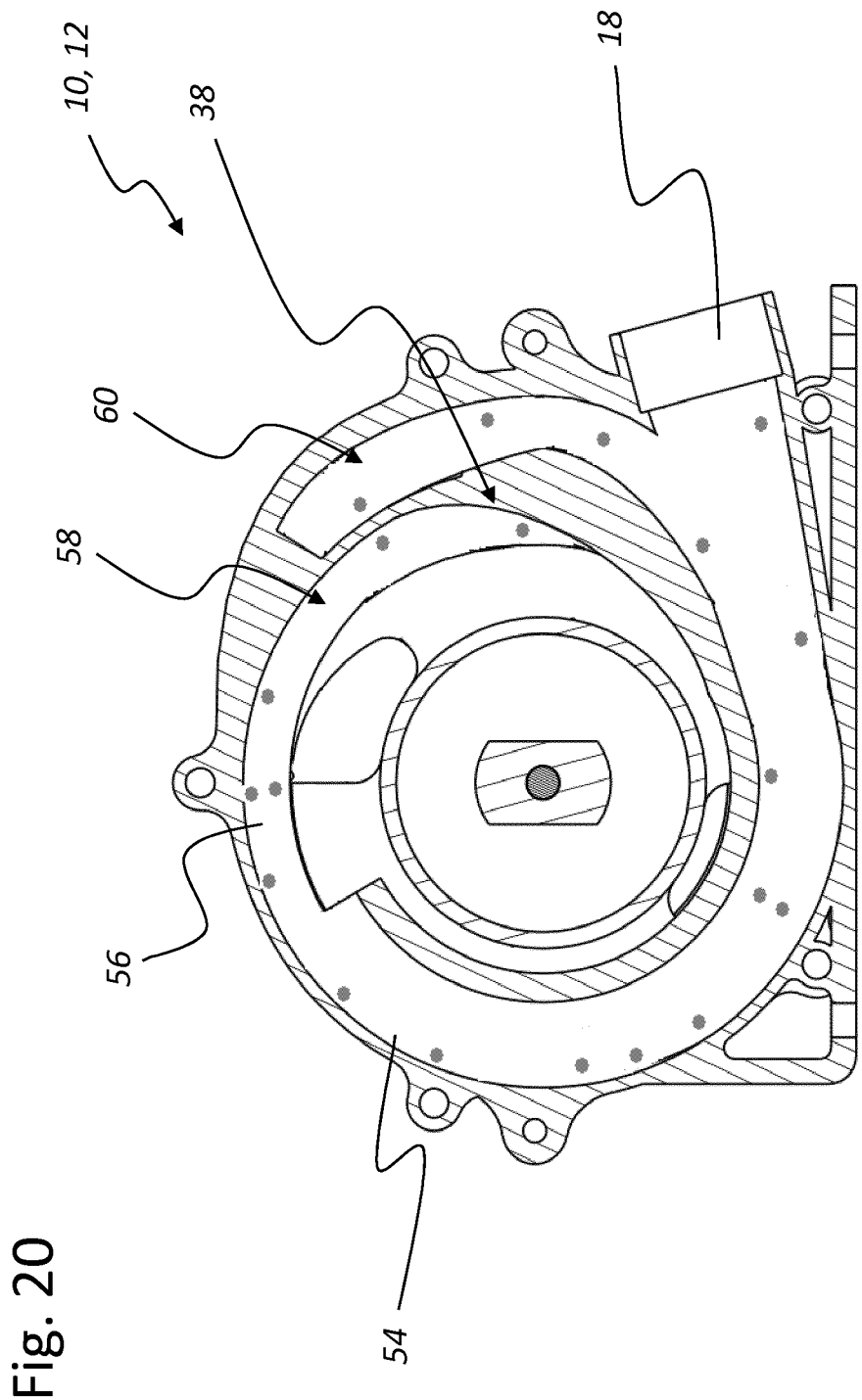
Figure 21:
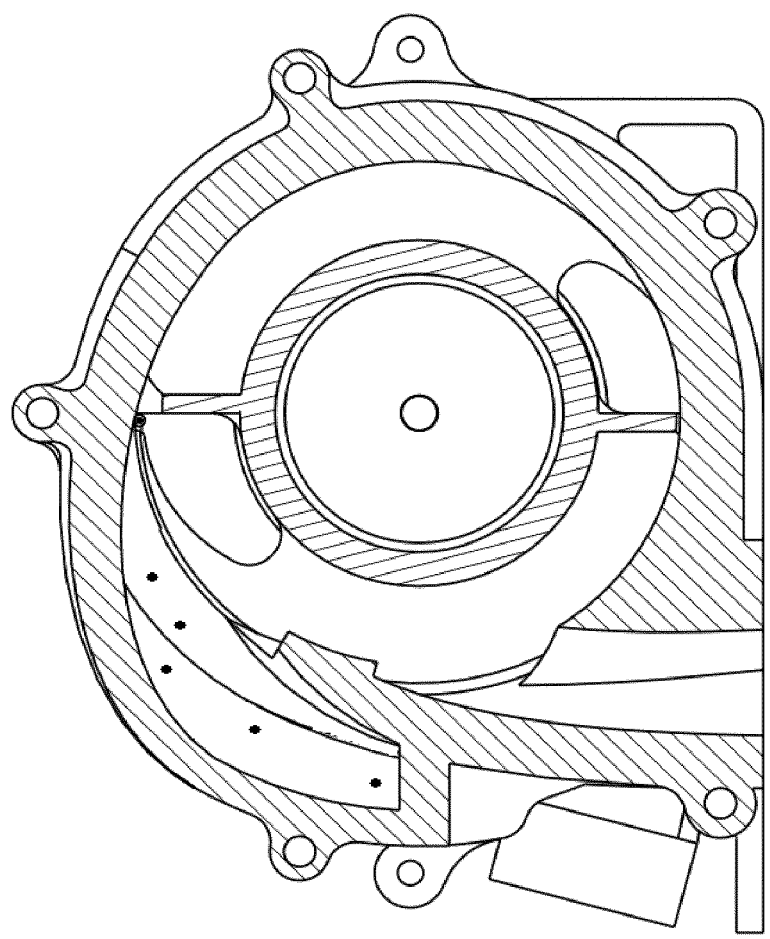

Sectional illustrations of this variant with the air conveyance as shown in FIG. 18 and FIG. 19 with the inlet 18 located at the bottom, are further shown in FIG. 20 and in FIG. 21. Here, the airflow is also conveyed along the disc 26 in a tangential direction, having a filling side downstream and a discharge side upstream of the separation disc 26. As illustrated in more detail in FIG. 20, the airflow 20 enters through the inlet opening 18 into the housing 14 and flows around the metering device, first, in a closed channel 54 as well as subsequently through an open channel 56 followed, lastly, by conveyance to separation disc 26. As with the previously shown alternative embodiments, the grains are urged towards the separation disc 26 and pushed towards the discharge via the ridge section 38. The remaining grains on the conveying side reach the outlet opening 58, again, based on the contour of the ridge section 38. The remaining grains on the discharge side reach the conveyance flow also via a channel 60.

The longitudinal sectional view in FIG. 22 and the detailed views in FIG. 23a and FIG. 23b illustrate further details of the grain guiding structure.

The schematic views of FIGS. 24 to 27 illustrate a further alternative embodiment of a distribution unit 10 or seeding unit according to the invention, wherein the distribution of grains is implemented without the carrying airflow but in a purely mechanical way. The seed commodity is conveyed from a container 62. Subsequently, a screw 64, which is driven by the separation disc 66, transports the grains to the separation chamber 68. The grains are separated in the separation chamber 68, wherein a portion of the remaining grains remains in the chamber 68 straight away, and is re-conveyed to the separation disc 66 via the outlet opening 70. In parallel, a portion of the excess amount is also transported via an excess flow 72 to the beginning 74 of the screw 64, to avoid excess loading.

The size ratio of the diameter of the screw 64 compared to the diameter of the separation disc 66 can be large, depending on the requirements. With this, a sufficiently high rotation speed can be achieved despite a slowly running screw 64 at the separation disc 66. In the alternative, a gear ratio would be possible, as well.

The screw 64 and the separation disc 66 are preferably driven by an electric motor in this embodiment, the revolutions per minute of which are variable as needed in adjusting to the forward speed, grain distance, etc.

Figure 25:
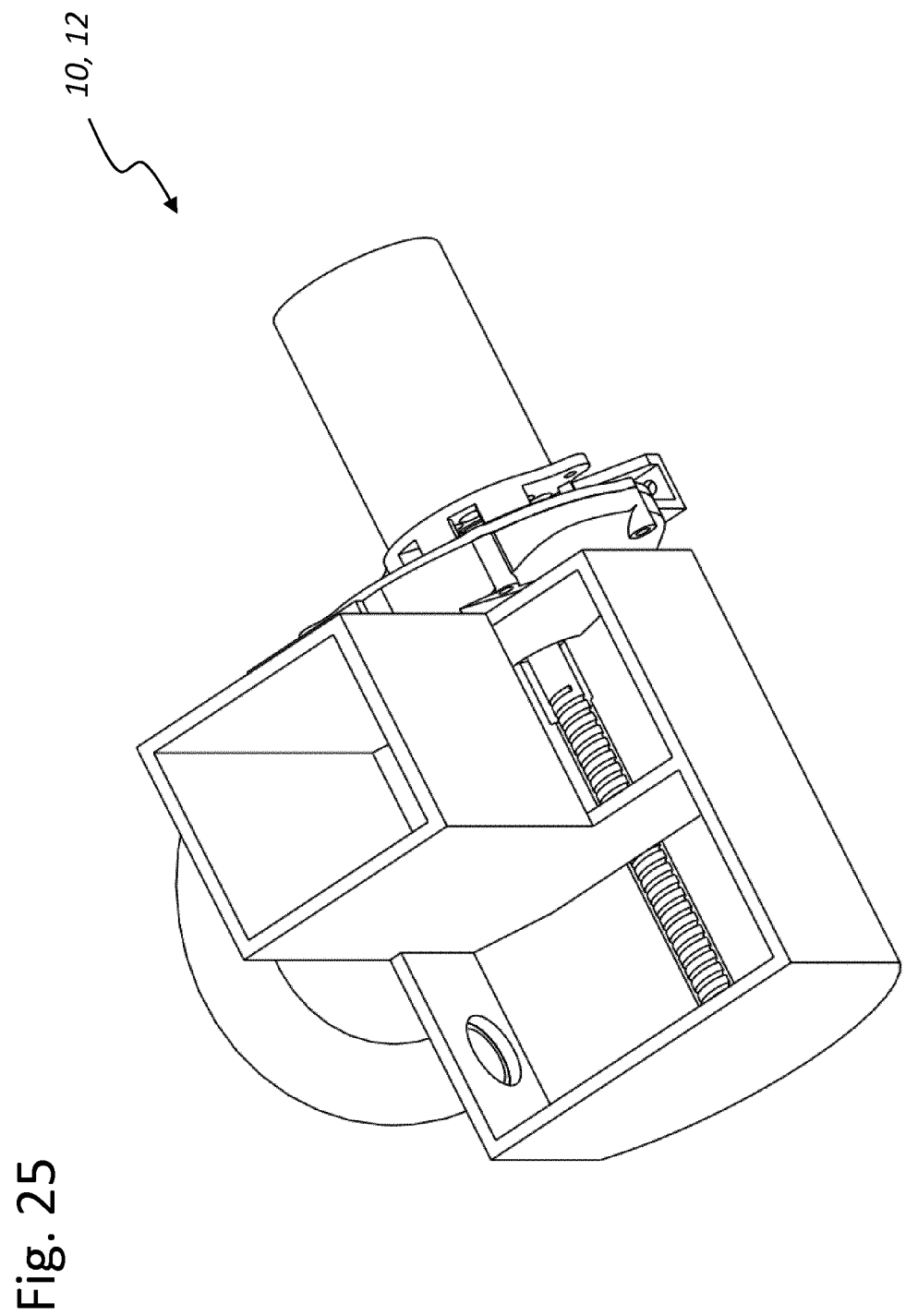
Figure 26:
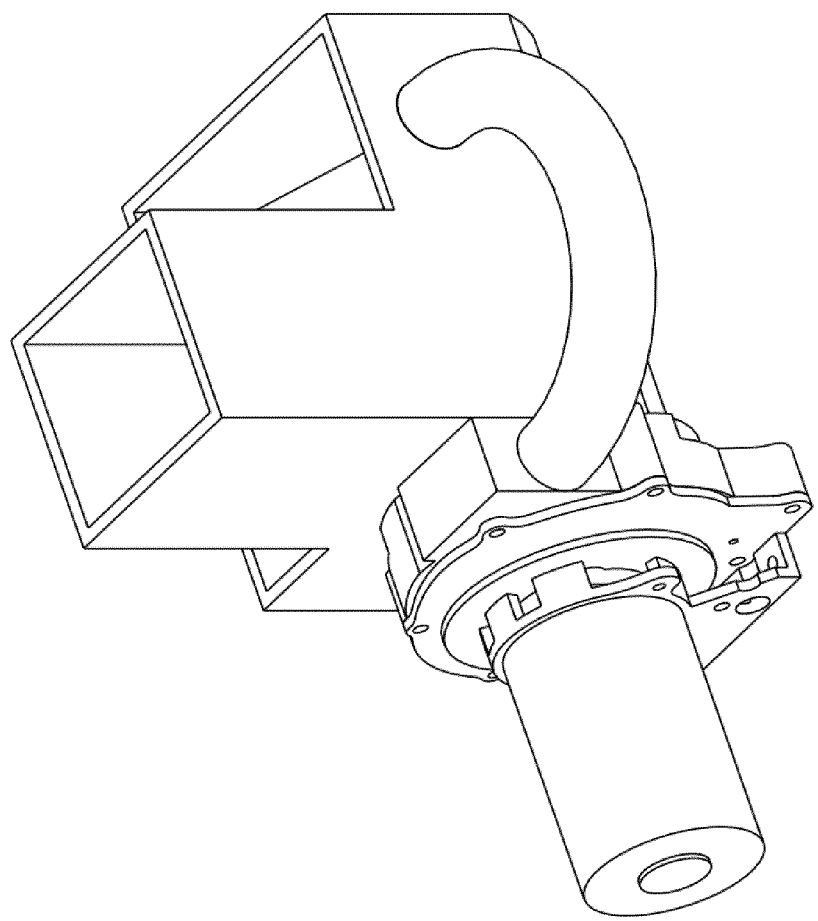
Figure 27:
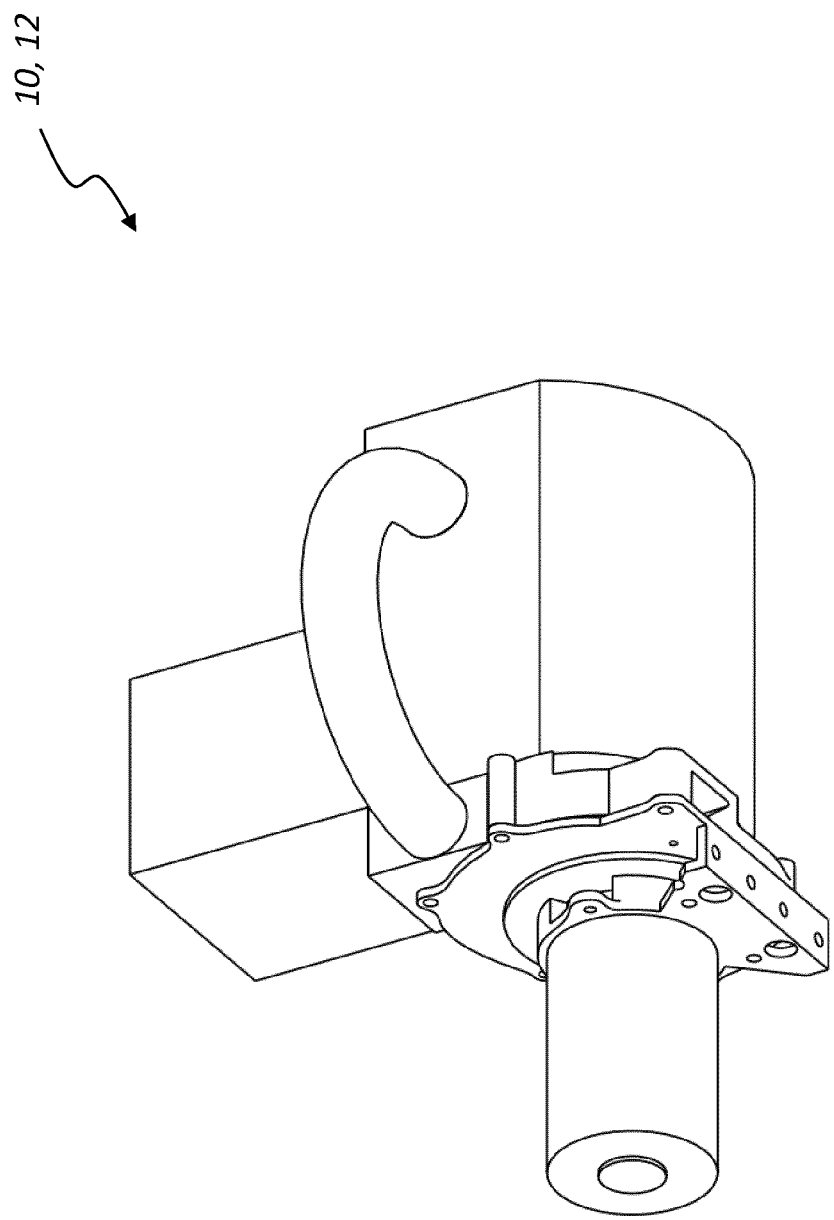

FIGS. 25, 26 and 27 show the alternative embodiment of the distribution unit 10 according to FIG. 24 in various views.

LIST OF REFERENCE NUMERALS 10 distribution unit
12 seeding unit
14 housing
16 inner circumferential surface
18 inlet opening
20 airflow
22 conveying device
24 outlet opening
26 disc, separation disc, seeding disc
28 step, entrainment step
29 groove
30 wall surface
32 inclined housing surface
34 grain (34a, 34b)
36 discharge region
38 ridge section
40 ramp section
42 circular path
44 opened curve
45 straight course of movement
46 groove
48 first phase
50 second phase
52 third phase
54 closed channel
56 opened channel
58 outlet stream
60 channel
62 container
64 screw 66 separation disc
68 separation chamber
70 outlet opening
72 overflow opening
74 beginning of screw
76 electric motor, drive motor
80 step
82 grain discharge space
84 grain guiding groove, grain guiding edge
86 ramp
88 slope
90 further slope
A filling region
B separation region
C re-conveying region

The invention claimed is:

1. A distribution unit for separating individual grains from a plurality of grains of a granular material comprising a housing having an inner circumferential surface, at least one inlet opening for conveyed granular material, a conveying device concentrically rotating in the housing for the conveyed granular material, and at least one outlet opening, which outlet opening connects approximately tangentially to the inner circumferential surface, the conveying device having one or more openings and/or steps at the outer periphery thereof, which, in a conveying region of the housing, form a pocket with the housing inner circumferential surface into which a plurality of the grains are urged and conveyed circularly by centrifugal forces, supported by the conveying device, and, in a separation region of the housing, only one individual grain of the plurality of grains remains in the opening or against the step of the conveying device due to a modified contour of the inner circumferential surface of the housing and under the influence of centrifugal forces, excess grains are advanced radially outward from the opening or from against the step of the conveying device and in turn are conveyed back to the conveying region of the housing for re-conveying.

2. The distribution unit according to claim 1, wherein the inner circumferential surface of the housing forms a radial guide for the grains, which radially guides the grains while being pushed by the conveying device supported by centrifugal forces, which are larger than the gravitational force.

3. The distribution unit according to claim 2, wherein the radial guide is reduced in height or tapered off in cross section along at least a portion of the separation region, creating a clearance into which picked-up excess grains are urged radially outward relative to the conveying device due to centrifugal forces and thus only one grain remains in the radial guide.

4. The distribution unit according to claim 2, wherein the radial guide formed in the inner circumferential surface comprises a groove and at least one side of the radial guide is narrowed or reduced in width along at least a portion of the separation region, whereby an outward clearance is created into which entrained excess grains are urged due to centrifugal forces and thus only one grain remains in the narrowed, radial guide.

5. The distribution unit according to claim 2, wherein at least on one side of the radial guide there is a clearance, through which picked-up excess grains are urged radially outwardly beyond the circumferential surface due to centrifugal forces and thus only one grain, respectively, remains in the conveying device.

6. The distribution unit according to claim 1, wherein entrainment devices of the conveying device form a conveying pocket with the inner circumferential surface of the housing, wherein the inner circumferential surface transitions from a wide region into a narrow region so that the narrow region of the inner circumferential surface only offers sufficient guidance for one grain to be conveyed.

7. The distribution unit according to claim 1, wherein the granular material is tangentially conveyed towards the conveying device and leaves the conveying device tangentially.

8. The distribution unit according to claim 1, wherein the granular material is tangentially re-conveyed into the housing where it rotates around a rotational axis of the conveying device, and subsequently leaves the housing tangentially.

9. The distribution unit according to claim 1, wherein the inner circumferential surface of the housing is inclined towards the conveying device.

10. The distribution unit according to claim 1, wherein the conveying device is driven electrically, hydraulically, or pneumatically.

11. A metering device for grains of a granular material, comprising a housing having an inner circumferential surface, at least one inlet opening through which conveyed granular material enters the housing, a conveying disc rotating in the housing and at least one outlet opening in the housing, the conveying disc having at least one recess formed on an outer periphery thereof which forms a pocket with the housing inner circumferential surface and wherein, in a first conveying region of the housing, the inner circumferential surface has a first contour sized such that a plurality of the grains of the granular material entering the housing through the inlet opening may be urged by centrifugal forces into the pocket and conveyed circularly, supported by the conveying disc, and in a second separation region of the housing, the inner circumferential surface has a modified contour sized so that under the influence of centrifugal forces only one individual grain remains in the pocket and excess grains are advanced radially outward past the inner circumferential surface forming the pocket.

12. The metering device as in claim 11 wherein the first and modified contours of the inner circumferential surface form a two-sided guide for the individual grains, which guides the grains while being conveyed by the conveying disc, wherein along the modified contour of the inner circumferential surface in the second separation region, at least on one side of the guide is reduced in height creating a clearance into which excess grains are urged due to centrifugal forces so that only one grain remains in the pocket formed by the conveying disc and the inner circumferential surface.

13. The metering device as in claim 12 wherein an entrainment step is formed on said conveying disc adjacent each of said at least one recess for conveying the grains in the housing.

14. The metering device as in claim 12 wherein, in the second separation region of the housing, the guide opens tangentially to the outlet opening so that only the one individual grain remaining in the pocket is discharged through the outlet opening as the portion of the conveying disc forming the pocket rotates into alignment with the outlet opening.

15. A metering device for grains of a granular material, comprising a housing having an inner circumferential surface, at least one inlet opening through which conveyed granular material enters the housing, a conveying disc rotating in the housing and at least one outlet opening in the housing, the conveying disc having at least one entrainment step formed on said conveying disc adjacent an outer periphery thereof which forms a pocket with the housing inner circumferential surface and wherein, in a first conveying region of the housing, the inner circumferential surface has a first contour sized such that a plurality of the grains of the granular material entering the housing through the inlet opening may be urged by centrifugal forces into the pocket and conveyed circularly, supported by the entrainment step, and in a second separation region of the housing, the inner circumferential surface has a modified contour sized so that under the influence of centrifugal forces only one individual grain remains in the pocket and excess grains are advanced radially outward past the inner circumferential surface forming the pocket.

16. The metering device as in claim 15 wherein the first and modified contours of the inner circumferential surface form a two-sided guide for the individual grains, which guides the grains while being conveyed by the entrainment step, wherein the modified contour of the inner circumferential surface at least on one side thereof is reduced in height creating a clearance into which excess grains are urged due to centrifugal forces so that only one grain remains in the pocket formed by the entrainment step and the inner circumferential surface.

17. The metering device as in claim 16 wherein, in the second separation region of the housing, the guide opens tangentially from the second separation region of the inner circumferential surface to the outlet opening so that only the one individual grain remaining in the pocket is discharged through the outlet opening as the portion of the conveying disc forming the pocket rotates into alignment with the outlet opening.

* * * * *